US011997676B2

(12) United States Patent
Agiwal et al.

(10) Patent No.: US 11,997,676 B2
(45) Date of Patent: *May 28, 2024

(54) METHOD AND APPARATUS FOR COMMUNICATING DATA PACKETS IN A CLOUD CELL

(71) Applicant: Samsung Electronics Co., Ltd., Suwon-si (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

This patent is subject to a terminal disclaimer.

(21) Appl. No.: 17/443,413

(22) Filed: Jul. 26, 2021

(65) Prior Publication Data

US 2021/0360607 A1 Nov. 18, 2021

Related U.S. Application Data

(63) Continuation of application No. 16/680,348, filed on Nov. 11, 2019, now Pat. No. 11,076,386, which is a (Continued)

(30) Foreign Application Priority Data

Apr. 13, 2012 (IN) .......................... 1499/CHE/2012

(51) Int. Cl.
*H04W 74/04* (2009.01)
*H04L 1/1829* (2023.01)
(Continued)

(52) U.S. Cl.
CPC ........... *H04W 72/20* (2023.01); *H04L 1/1829* (2013.01); *H04L 1/1867* (2013.01);
(Continued)

(58) Field of Classification Search
CPC . H04W 72/0406; H04W 84/047; H04W 4/06; H04L 1/1867; H04L 1/1829; H04B 7/15528

See application file for complete search history.

(56) References Cited

U.S. PATENT DOCUMENTS 6,944,123 B1 9/2005 Moon
7,664,458 B2 2/2010 Ishii et al.
(Continued)

FOREIGN PATENT DOCUMENTS

| CN | 101061686 A | 10/2007 |
|---|---|---|
| WO | 200233866 A2 | 4/2002 |
| WO | 2008155764 A2 | 12/2008 |

OTHER PUBLICATIONS

International Search Report dated Jul. 26, 2013 in connection with International Patent Application No. PCT/KR2013/003111, 3 pages.
(Continued)

*Primary Examiner* — Anez C Ebrahim

(57) ABSTRACT

The present disclosure provides a method and apparatus for communicating data packets in a cloud cell. In one embodiment, a network node from which data packets are received is identified by the BS. If the data packets are received from a data gateway, a network node to which the data packets to be sent is identified. If the data packets are to be sent to a slave BS, partial processing is performed on the data packets by the master BS. Furthermore, partially processed data packets are transmitted to the slave BS so that the slave BS performs complete processing on the partially processed data packets and transmits the completely processed data packets to the MS. If the data packets are to be sent to the MS, then complete processing of the data packets is performed by the BS and transmitted to the MS.

16 Claims, 19 Drawing Sheets

Related U.S. Application Data continuation of application No. 15/432,894, filed on Feb. 14, 2017, now Pat. No. 10,477,521, which is a continuation of application No. 13/862,156, filed on Apr. 12, 2013, now Pat. No. 9,572,132.

(51) Int. Cl.
*H04L 1/1867* (2023.01)
*H04W 72/20* (2023.01)
*H04L 1/00* (2006.01)
*H04L 1/18* (2023.01)
*H04W 84/04* (2009.01)
*H04W 88/08* (2009.01)
*H04W 88/16* (2009.01)

(52) U.S. Cl.
CPC ........ *H04L 2001/0097* (2013.01); *H04L 1/18* (2013.01); *H04W 84/045* (2013.01); *H04W 88/08* (2013.01); *H04W 88/16* (2013.01)

(56) References Cited

U.S. PATENT DOCUMENTS

| | | |
|---|---|---|
| 2003/0110379 A1 | 6/2003 | Ylonen et al. |
| 2003/0147371 A1 | 8/2003 | Choi et al. |
| 2006/0165045 A1 | 7/2006 | Kim et al. |
| 2007/0189304 A1 | 8/2007 | Rosa |
| 2007/0281613 A1 | 12/2007 | Lee et al. |
| 2008/0045212 A1 | 2/2008 | Kim et al. |
| 2008/0064403 A1 | 3/2008 | Take |
| 2008/0119189 A1 | 5/2008 | Chang et al. |
| 2008/0181318 A1 | 7/2008 | Kim et al. |
| 2009/0124259 A1 | 5/2009 | Attar et al. |
| 2009/0168724 A1 | 7/2009 | Umesh et al. |
| 2010/0110971 A1 | 5/2010 | Kim et al. |
| 2010/0135249 A1 | 6/2010 | Meyer et al. |
| 2011/0096701 A1* | 4/2011 | Lin ................. H04L 1/0001 370/280 |
| 2011/0164694 A1 | 7/2011 | Yamasaki et al. |
| 2011/0275359 A1 | 11/2011 | Sebire et al. |
| 2012/0093070 A1* | 4/2012 | Huang ............. H04W 84/047 370/315 |
| 2012/0093081 A1* | 4/2012 | Hapsari ........... H04W 12/037 370/328 |
| 2016/0254889 A1* | 9/2016 | Shattil ............. H04B 7/0452 370/329 |

OTHER PUBLICATIONS

Written Opinion of International Searching Authority dated Jul. 26, 2013 in connection with International Patent Application No. PCT/KR2013/003111, 5 pages.

Extended European Search Report dated Oct. 23, 2015 in connection with European Patent Application No. 13775757.1, 10 pages.

First Office Action dated Sep. 2, 2016 in connection with Chinese Application No. 2013800249944, 20 pages.

European Search Report dated Apr. 18, 2023, in connection with European Application No. 23157087.0, 9 pages.

* cited by examiner

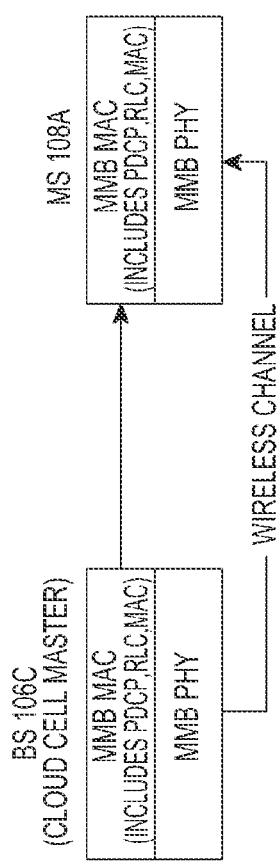
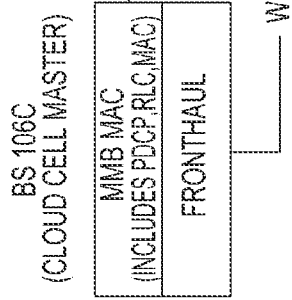
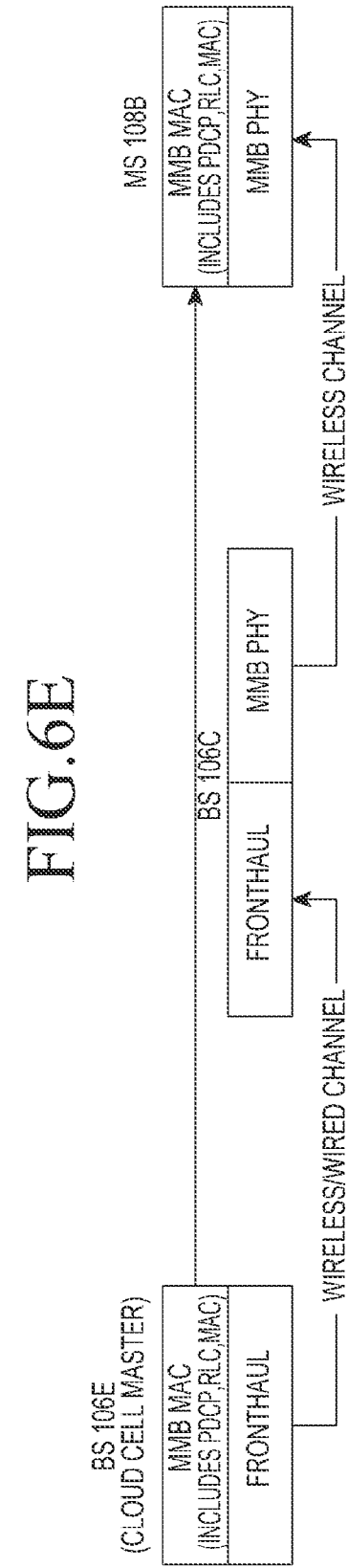
FIG. 6D
FIG. 6E
FIG. 6F

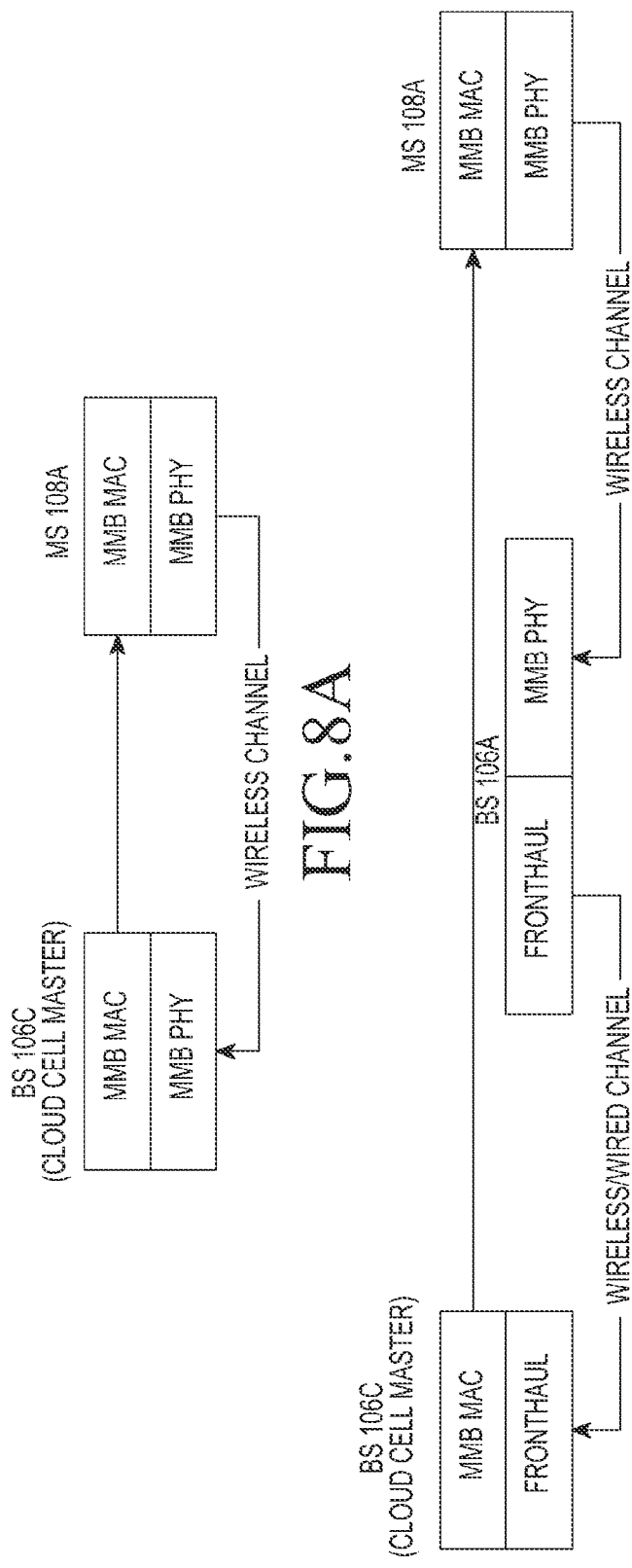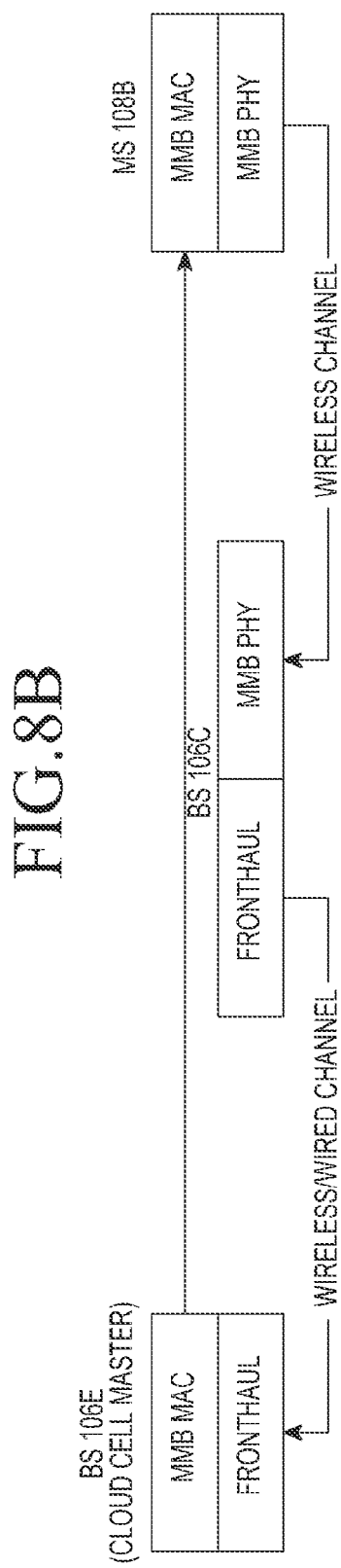

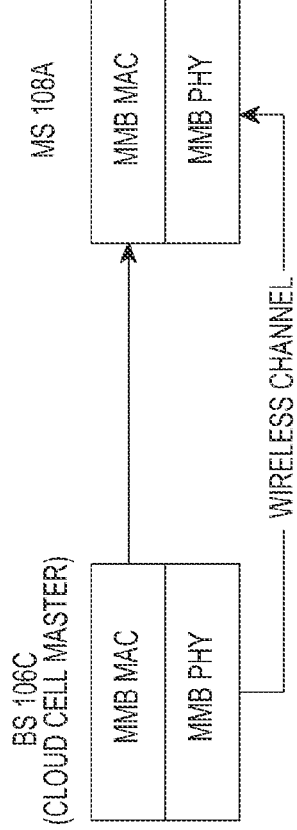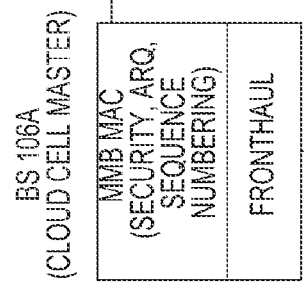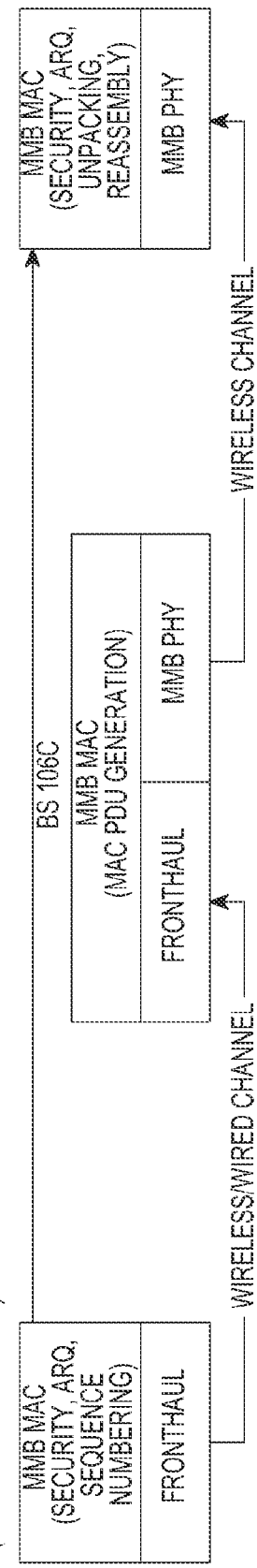
FIG. 10A
FIG. 10B
FIG. 10C

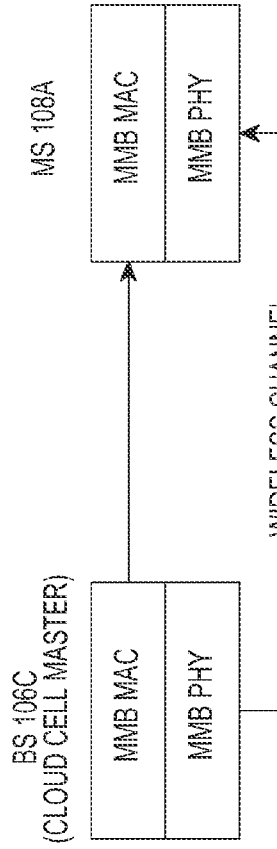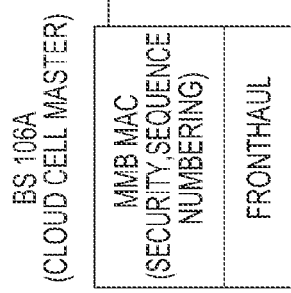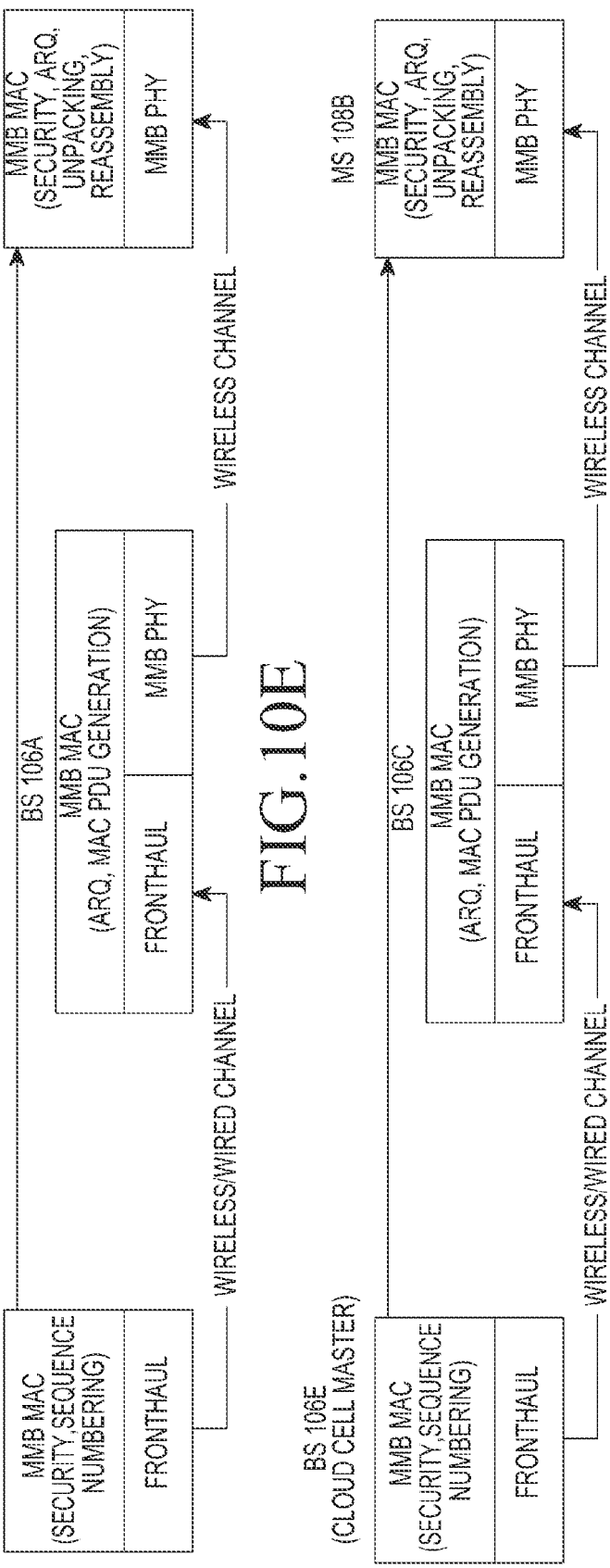
FIG. 10D
FIG. 10E
FIG. 10F

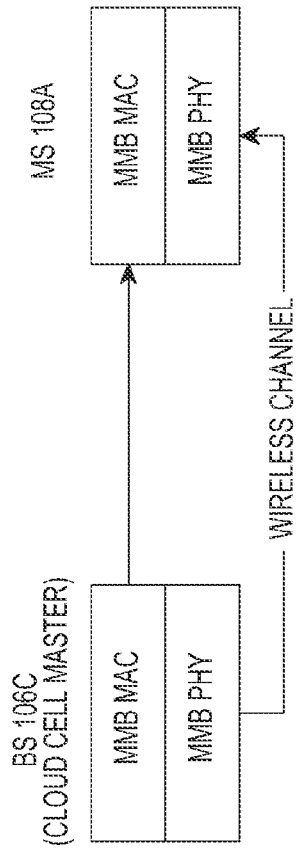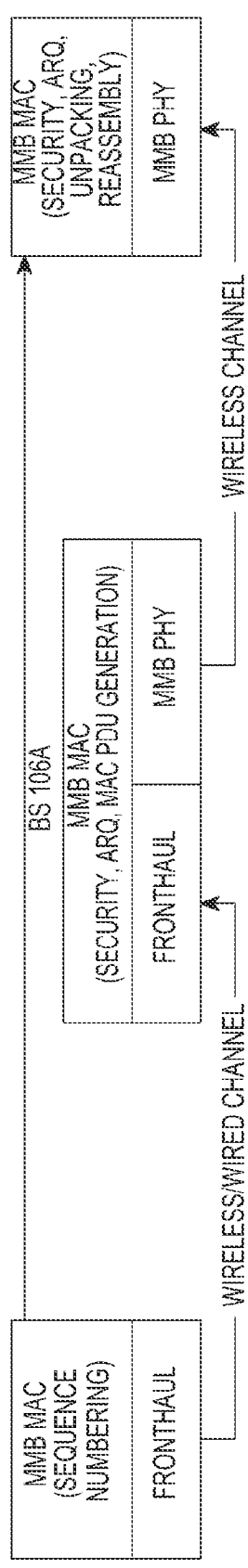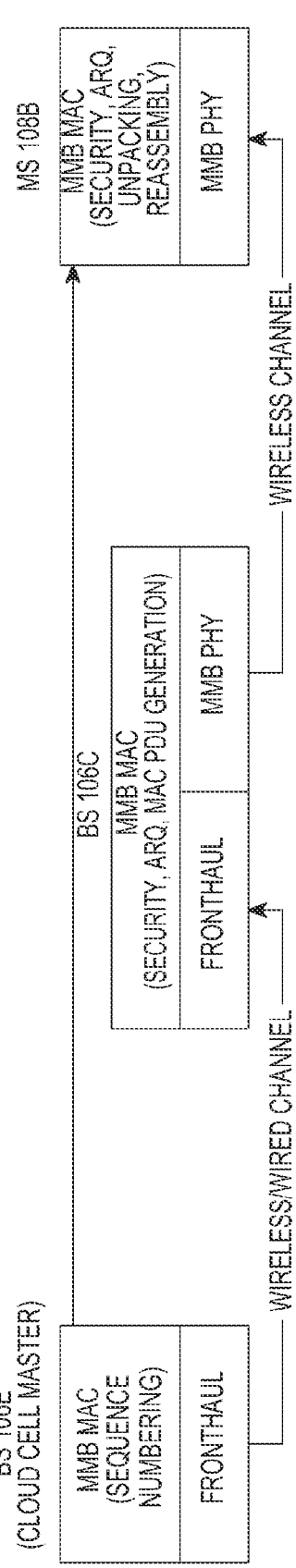

METHOD AND APPARATUS FOR COMMUNICATING DATA PACKETS IN A CLOUD CELL

CROSS-REFERENCE TO RELATED APPLICATIONS

This application is a continuation of application Ser. No. 16/680,348, filed Nov. 11, 2019, which is a continuation of application Ser. No. 15/432,894, filed Feb. 14, 2017, now patent Ser. No. 10/477,521, which is a continuation of application Ser. No. 13/862,156, filed Apr. 12, 2013, now U.S. Pat. No. 9,572,132, which claims priority to Indian Application No. 1499/CHE/2012, filed Apr. 13, 2012, the contents of which are incorporated herein by reference.

BACKGROUND

1. Field

The present disclosure relates to the field of Millimeter-Wave Mobile Broadband (MMB) system, and more particularly relates to a method and apparatus for communicating data packets in a cloud cell.

2. Description of Related Art

Millimeter-Wave Mobile Broadband (MMB) system is a millimeter wave based system which operates in a radio frequency range of 30 Gigahertz (GHZ) and 300 GHz. MMB system uses radio waves with wavelength in range of 1 millimeter (mm) to 10 mm and is a candidate for next generation mobile communication technology due to considerable amount of spectrum available in mmWave band.

Generally, in a MMB system, MMB base stations are deployed with higher density than macro-cellular base stations in order to ensure good network coverage. This is possible as transmission and reception of signals is based on narrow beams which suppress interference from neighbouring MMB base stations and extend the range of an MMB link.

Typically, in a MMB network, multiple MMB base stations form a grid with a large number of nodes with which a mobile station can communicate, thereby ensuring high quality equal grade of service (EGOS) irrespective of the location of the mobile station. The grid having a plurality of MMB base stations serving a mobile station is commonly termed as virtual cell or cloud cell. In a cloud cell, the multiple base stations communicating with the mobile stations need to perform downlink transmission beamforming while the mobile stations communicating with the base stations need to perform downlink reception beamforming for receiving downlink control information and data packets. Similarly, a mobile station communicating with a base station in a cloud cell may need to perform uplink transmission beamforming while the base station needs to perform uplink reception beamforming for transmitting uplink data.

Further, in a cloud cell, one of the base stations acts a master base station and remaining base stations acts slave base stations with respect to the mobile station. In overlapping cloud cell scenario, a base station can be a part of more than one cloud cells. In one cloud cell, the base station acts as a master base station for one mobile station and in another cloud cell, the base station act as a slave base station for another mobile station.

In a conventional cellular system, in which a mobile station communicates with a single base station, the base station receives data packets from the IP network via data gateway in downlink, performs Medium Access Control (MAC) and Physical (PHY) processing of the data packets and transmits physical burst carrying the processed data packets to the mobile station. In the uplink, the base station receives physical bursts from the mobile station, performs PHY and MAC processing of the physical bursts, and transmits data packets to an Internet Protocol (IP) network via the data gateway.

In another conventional cellular system, in which a mobile station communicates with a base station via a relay station, the base station receives data packets from the IP network via data gateway in downlink, performs MAC processing of the data packets and transmits MAC Protocol Data Units (PDUs) to the relay station. The relay station performs PHY processing of the MAC PDUs and transmits the physical bursts carrying the MAC PDUs to the mobile station. In the uplink, the relay station receives the physical burst from the mobile station, performs PHY processing of the physical burst and transmits the MAC PDUs received in the physical bursts to the base station so that the base station transmits the data packets containing the MAC PDUs to the data gateway.

However, in a cloud cell environment, since multiple base stations are grouped together to serve a mobile station and the mobile station communicates with multiple base stations in a cloud cell, it is desirable to address problems associated with routing data packets from the IP network to the mobile station through the base station(s) in the cloud cell, processing of data packets across the base station(s) in the cloud cell in downlink and uplink and routing data packets from the mobile station to the IP network through the base station(s) in the cloud cell.

SUMMARY

To address the above-discussed deficiencies of the prior art, it is a primary object to provide a method and apparatus for communicating data packets in a cloud cell. In one aspect, a method includes identifying a first network node from which at least one data packet intended for a mobile station in a cloud cell is received by a base station, where the first network node may include one of a data gateway and a master base station of the cloud cell.

The method further includes identifying a second network node in the cloud cell to which the at least one data packet is to be sent if the at least one data packet is received from the data gateway, where the second network node includes one of the mobile station and one of slave base stations of the cloud cell. Furthermore, the method includes performing entire processing of the at least one data packet received from the data gateway and transmitting the entirely processed data packet to the mobile station if the second network node is the mobile station.

Alternatively, the method includes performing partial processing of the at least one data packet received from the data gateway if the second network node is said one of the slave base stations and transmitting the partially processed data packet to said one of the slave base stations so that said one of the slave base stations entirely processes the partially processed data packet and transmits the entirely processed data packet to the mobile station. Moreover, the method includes performing entire processing of the at least one data packet if the at least one data packet is received from the master base station and transmitting the entirely processed data packet to the mobile station, where the at least one data packet received from the master base station is a partially processed data packet.

In another aspect, a base station includes a processor and a memory coupled to the processor, where the memory includes a packet manager configured for performing the method described above.

In yet another aspect, a method of a base station for uplink data transmission in a cloud cell includes identifying a first network node in a cloud cell from which at least one data packet intended for an Internet Protocol (IP) network is received by a base station, where the first network node includes one of a mobile station and one of slave base stations. The method further includes identifying a second network node to which the at least one data packet is to be sent if the at least one data packet is received from the mobile station, where the second network node includes one of a data gateway and a master base station of the cloud cell.

Furthermore, the method includes performing complete processing of the at least one data packet received from the mobile station and transmitting the completely processed data packet to the data gateway if the second network node is the data gateway. Alternatively, the method includes performing partial processing of the at least one data packet received from the mobile station if the second network node is the master base station and transmitting the partially processed data packet to the master base station so that the master base station entirely processes the partially processed data packet and transmits the entirely processed data packet to the data gateway.

Moreover, the method includes performing entire processing of the at least one data packet if the at least one data packet is received from said one of the slave base stations and transmitting the entirely processed data packet to the data gateway, where the at least one data packet received from said one of the slave base stations is a partially processed data packet.

In further another aspect, a base station includes a processor and memory coupled to the processor, where the memory includes a packet manager configured for performing the method described above.

Other features of the embodiments will be apparent from the accompanying drawings and from the detailed description that follows.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A-6F are schematic representations illustrating downlink communication of data packets in the cloud cell environment by a base station, according to one embodiment of the present disclosure.

FIGS. 8A-8F are schematic representations illustrating uplink communication of data packets in the cloud cell environment by a base station, according to one embodiment of the present disclosure.

The drawings described herein are for illustration purposes only and are not intended to limit the scope of the present disclosure in any way.

DETAILED DESCRIPTION

FIGS. 1 through 13, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged telecommunication technologies. The present disclosure provides a method and apparatus for communicating data packets in a cloud cell. In the following detailed description of the embodiments of the present disclosure, reference is made to the accompanying drawings that form a part hereof, and in which are shown by way of illustration specific embodiments in which the present disclosure may be practiced. These embodiments are described in sufficient detail to enable those skilled in the art to practice the present disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1:
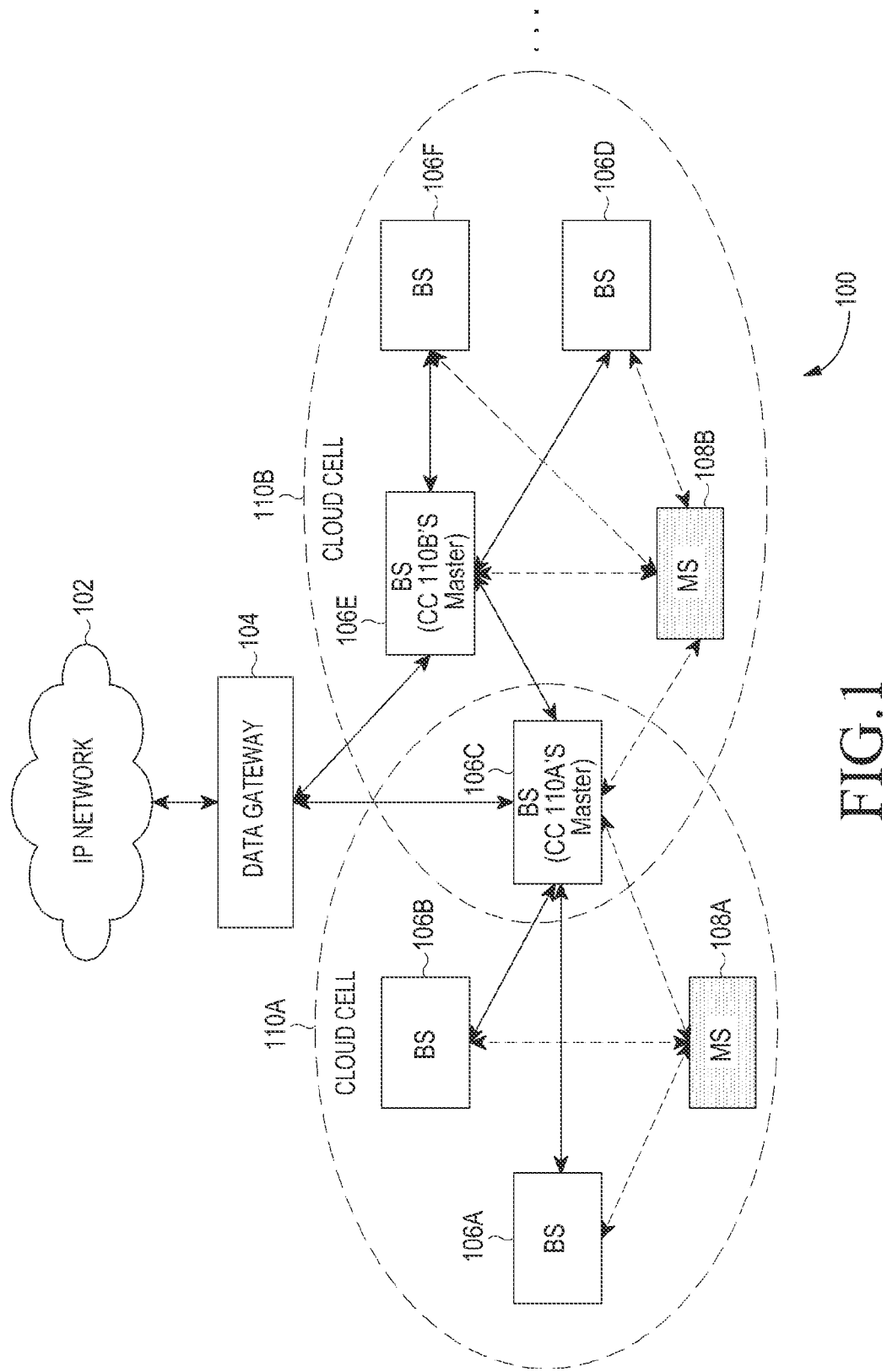
FIG. 1 is a schematic diagram illustrating a cloud cell environment, according to one embodiment of the present disclosure.

FIG. 1 is a schematic diagram illustrating a cloud cell environment 100, according to one embodiment of the present disclosure. The cloud cell environment 100 includes a plurality of cloud cells 110A-N. For the purpose of illustration, two cloud cells viz. the cloud cell 110A and the cloud cell 110B are depicted in FIG. 1. The cloud cell 110A includes a multiple base stations (BSs) 106A-C serving a mobile station (MS) 108A. In the cloud cell 110A, the BS 106C is assigned a role of a master and remaining BSs 106A-B acts as a slave BS. Similarly, the cloud cell 110B includes multiple BSs 106C-F serving a MS 108B. In the cloud cell 110B, the BS 106E is a master BS while the remaining BSs 106C-D and 106F acts as slave BSs. As depicted in FIG. 1, the BS 106C is a master BS for the cloud cell 110A and is a slave BS for the cloud cell 110B. It can be noted that, BSs in a cloud cell and a master BS keep changing based on the movement of MS.

In each of the cloud cells 110A-N, a master BS can directly communicate data packets with a data gateway 104 while a slave BS communicates with the data gateway via the master BS. The master BS can be physically or logically connected to the data gateway 104. The data gateway 104 can be a logical entity residing in one of BSs in a wireless communication network. The data gateway 104 can be directly connected to an Internet Protocol (IP) network or connected via other network nodes. Also, the master BS in the cloud cell can directly communicate data packets with MS or via another slave BS.

According to the present disclosure, the BSs 106A-F processes data packets intended for data gateway 104/MS 108A-B based on a source network node (e.g., data gateway, master BS, slave BS or MS) from which the data packets are received and a destination network node (e.g., data gateway, master BS, slave BS or MS) to which the data packets are to be sent. It is appreciated that, each BS in a cloud cell environment 100 is capable of performing entire data packet processing functions on data packets in downlink as well as uplink. The detailed steps of processing and transmitting/receiving data packets by a master/slave BS in uplink and downlink are described in the following description.

Figure 2:
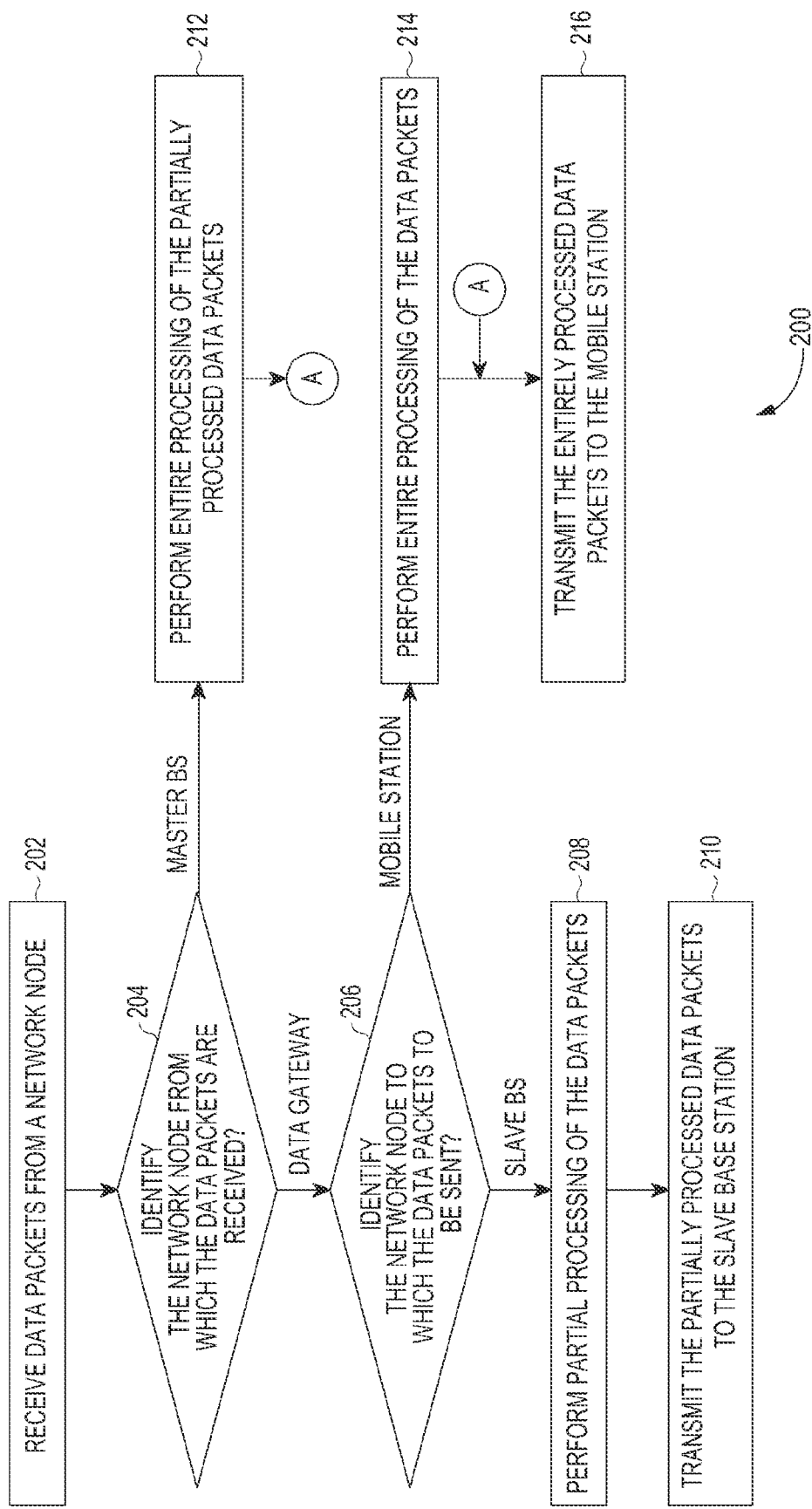
FIG. 2 is a process flowchart illustrating an exemplary method of downlink communication of data packets in the cloud cell environment by a base station, according to one embodiment of the present disclosure.

FIG. 2 is a process flowchart 200 illustrating an exemplary method of downlink communication of data packets in the cloud cell environment 100 by a BS, according to one embodiment of the present disclosure. Consider that, at step 202, data packets are received from a network node by the BS 106C. At step 204, the network node from which the data packets are received is identified by the BS 106C. For example, the BS 106C can receive the data packets directly from the data gateway 104 if the BS 106C acts a master BS of the Cloud Cell (CC) 110A. However, the BS 106C can receive the data packets from the BS 106E, which is master BS in the CC 110B, if the BS 106C acts as a slave base station with respect to the cloud cell 110B.

If the data packets are received from the data gateway 104, at step 206, a network node to which the data packets to be sent is identified. For example, the BS 106C can send the data packets directly to the MS 108A. Alternatively, the BS 106C can send the data packets to another BS (e.g., the BS 106A) which is a slave BS in the CC 110A.

If the data packets are to be sent to the BS 106A, at step 208, partial processing of the data packets is performed by the BS 106C. In one embodiment, in partially processing the data packets, the BS 106C generates the Medium Access Control (MAC) Service Data Units (SDUs) from the data packets received from the data gateway 104, generates Automatic Repeat Request (ARQ) blocks from the MAC SDUs, and generates MAC Protocol Data Units (PDUs) by applying the fragmentation and packing function on the ARQ blocks or MAC SDUs. It can be noted that, the security function is optional and if enabled, the BS 106C generates encrypted MAC SDUs from the data packets received from the data gateway 104. The BS 106C processes the MAC SDUs (encrypted or unencrypted) using an ARQ function to generate the ARQ blocks. The ARQ function is optional and is not needed for all the MAC SDUs. It is understood that, the BS 106C applies the ARQ function for the MAC SDUs of an ARQ enabled connection. The BS 106C then generates the MAC PDUs by applying fragmentation and packing function on the ARQ blocks for the ARQ enabled connection. It can be noted that, a single MAC PDU upon applying the fragmentation and packing function consists of one ARQ block fragment or multiple ARQ block fragments and/or unfragmented ARQ blocks.

Alternatively, for an ARQ enabled connection, the BS 106C applies fragmentation and packing function on the MAC SDUs to generate the ARQ block. In this case, the BS 106C does not apply fragmentation and packing function on the ARQ block to generate the MAC PDUs. In case of non-ARQ enabled connection, the BS 106C generates the MAC PDUs by applying fragmentation and packing function on the MAC SDUs. It can be noted that, a single MAC PDU upon applying the fragmentation and packing function consists of one MAC SDU fragment or multiple MAC SDU fragments and/or unfragmented MAC SDUs. The BS 106C can also multiplex ARQ blocks or MAC SDUs received from multiple connections in a single MAC PDU in case multiplexing is enabled.

In another embodiment, in partially processing the data packets, the BS 106C generates the MAC SDUs from the data packets received from the data gateway 104 and generates ARQ blocks from the MAC SDUs. It can be noted that, the security function is optional and if enabled, the BS 106C generates encrypted MAC SDUs from the data packets received from the data gateway 104. The MAC SDUs (encrypted or unencrypted) are then processed by ARQ function to generate the ARQ blocks. The ARQ function is optional and cannot be needed for all the MAC SDUs. It can be noted that, the BS 106C applies the ARQ function for the MAC SDUs of an ARQ enabled connection.

At step 210, the partially processed data packets and a logical identifier of the MS 108A are transmitted to the slave BS 106A so that the slave BS 106A performs entire processing of the partially processed data packets and transmits the completely processed data packets to the MS 108A based on the logical identifier of the MS 108A.

In one embodiment, in entirely processing the partially processed data packet, the slave BS 106A performs complete PHY layer processing of the partially processed data packet. The slave BS 106A generates one or more Physical (PHY) PDUs from the data packets (i.e., MAC PDUs) received from the master BS 106C. Then, the BS 106A processes the PHY PDUs using the physical layer processing functions such as coding, modulation, interleaving and the like, and transmits the processed PHY PDUs to the MS 108A.

In another embodiment, in entirely processing the partially processed data packets, the slave BS 106A performs the remaining MAC layer processing and complete PHY layer processing of the partially processed data packets. For example, the slave BS 106A generates MAC PDUs by applying fragmentation and packing function on the ARQ blocks for the ARQ enabled connection. Alternatively, for the ARQ enabled connection, the slave BS 106A applies fragmentation and packing function on the MAC SDUs to generate the ARQ block. In this case, the slave BS 106A does not apply fragmentation and packing function to generate the MAC PDUs.

In case of a non-ARQ enabled connection, the slave BS 106A generates MAC PDUs by applying fragmentation and packing function on the MAC SDUs. The BS 106A can also multiplex ARQ blocks or MAC SDUs received from multiple connections in a single MAC PDU if multiplexing is enabled.

Furthermore, the slave BS 106A generates one or more PHY PDUs from the data packets (i.e. MAC PDUs) received from the master BS 106C. Then, the slave BS 106A processes the PHY PDUs using the physical layer processing functions such as coding, modulation, interleaving and the like, and transmits the one or more processed PHY PDUs to the MS 108A.

In one exemplary implementation, the BS 106C sends the logical identifier with the partially processed data packets to the BS 106A when the MS 108A is assigned a single logical identifier. In another exemplary implementation, the BS 106C sends the logical identifier assigned by it with the completely processed data packets when the MS 108A is assigned one logical identifier by each BS in a cloud cell. In this implementation, the BS 106A maintains a mapping between a logical identifier assigned by the BS 106C and a logical identifier assigned by the BS 106A.

In yet another exemplary implementation, the BS 106C sends the logical identifier assigned by the BS 106A with the completely processed data packets when the MS 108A is assigned one logical identifier by each BS in a cloud cell. In this embodiment, the BS 106C maintains a mapping between a logical identifier assigned by the BS 106A and a logical identifier assigned by the BS 106C.

If the data packets are to be sent to the MS 108A, at step 214, complete processing of the data packets is performed by the BS 106C. At step 216, the completely processed data packets are transmitted to the MS 108A. In completely processing the data packets, the BS 106C generates the MAC SDUs from the data packets received from the data gateway 104, generates ARQ blocks from the MAC SDUs, generates MAC PDUs by applying the fragmentation, packing and multiplexing function on the ARQ blocks or the MAC SDUs, generates one or more PHY PDUs from the MAC PDUs, and processes the PHY PDUs using the physical layer processing functions such as coding, modulation, interleaving and the like.

If at step 204, the network node, from which the data packets are received, is identified as the master BS 106E, then it implies that the BS 106C is a slave BS in the CC 110B and the data packets are partially processed by the BS 106E. Hence, at step 212, complete processing of the partially processed data packets is performed by the BS 106C. At step 216, the completely processed data packets are transmitted to the MS 108B based on the logical identifier of the MS 108B.

In one embodiment, in entirely processing the partially processed data packet, the slave BS 106C performs complete PHY layer processing of the partially processed data packet. The slave BS 106C generates one or more PHY PDUs from the data packets (i.e., MAC PDUs) received from the master BS 106E. Then, the BS 106C processes the PHY PDUs using the physical layer processing functions such as coding, modulation, interleaving and the like, and transmits the processed PHY PDUs to the MS 108B.

In another embodiment, in entirely processing the partially processed data packets, the slave BS 106C performs the remaining MAC layer processing and complete PHY layer processing of the partially processed data packets. For example, the slave BS 106C generates MAC PDUs by applying fragmentation and packing function on the ARQ blocks for the ARQ enabled connection. Alternatively, for the ARQ enabled connection, the slave BS 106C applies fragmentation and packing function on the MAC SDUs to generate the ARQ block. In this case, the slave BS 106C does not apply fragmentation and packing function to generate the MAC PDU.

In case of a non-ARQ enabled connection, the slave BS 106C generates MAC PDUs by applying fragmentation and packing function on the MAC SDUs. The BS 106C can also multiplex ARQ blocks or MAC SDUs received from multiple connections in a single MAC PDU if multiplexing is enabled.

Furthermore, the slave BS 106C generates one or more PHY PDUs from the data packets (i.e. MAC PDUs) received from the master BS 106C. Then, the slave BS 106C processes the PHY PDUs using the physical layer processing functions such as coding, modulation, interleaving and the like, and transmits the one or more processed PHY PDUs to the MS 108B.

Figure 3:
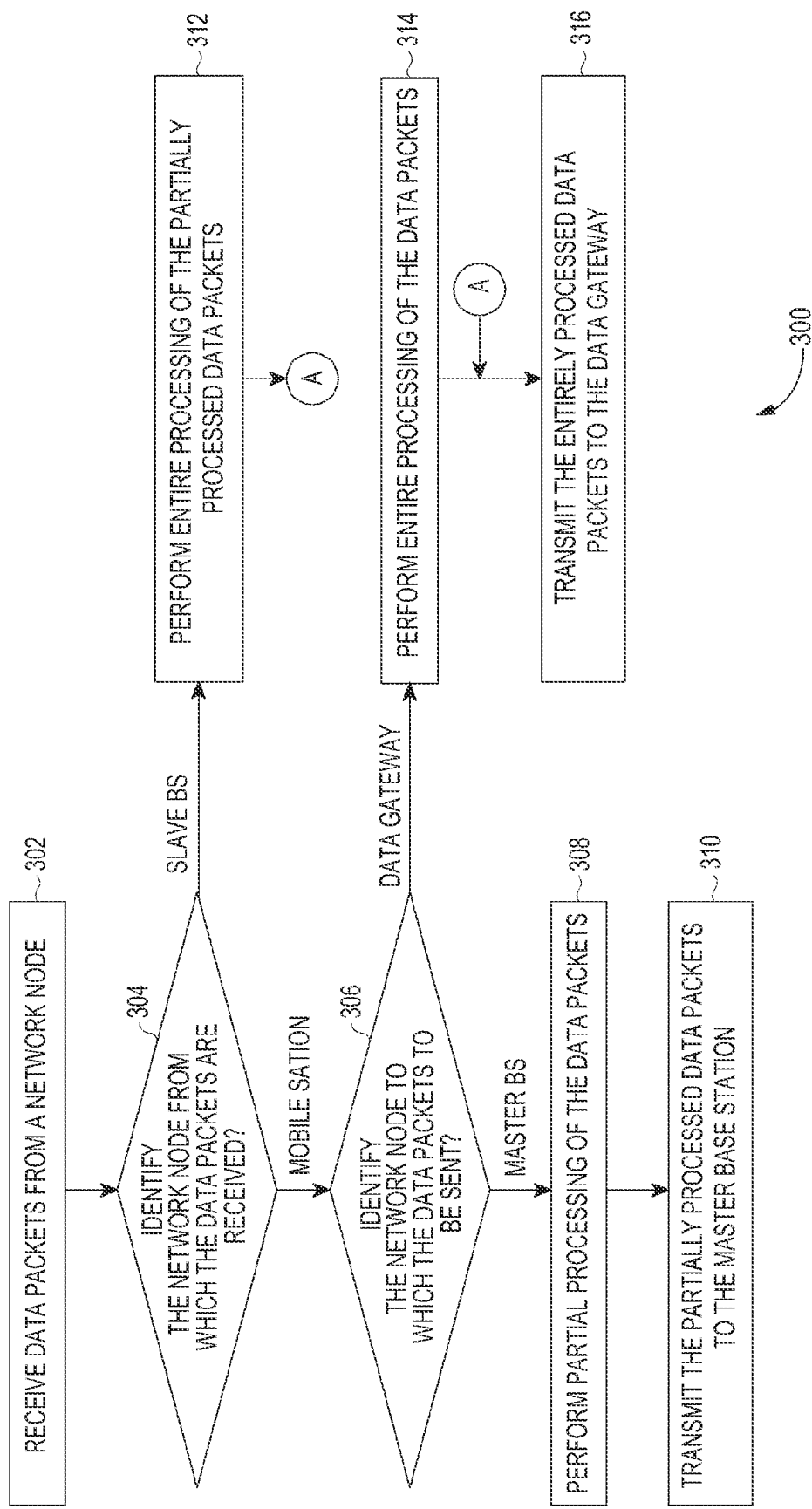
FIG. 3 is a process flowchart illustrating an exemplary method of uplink communication of data packets in the cloud cell environment by a base station, according to one embodiment of the present disclosure.
Figure 4:
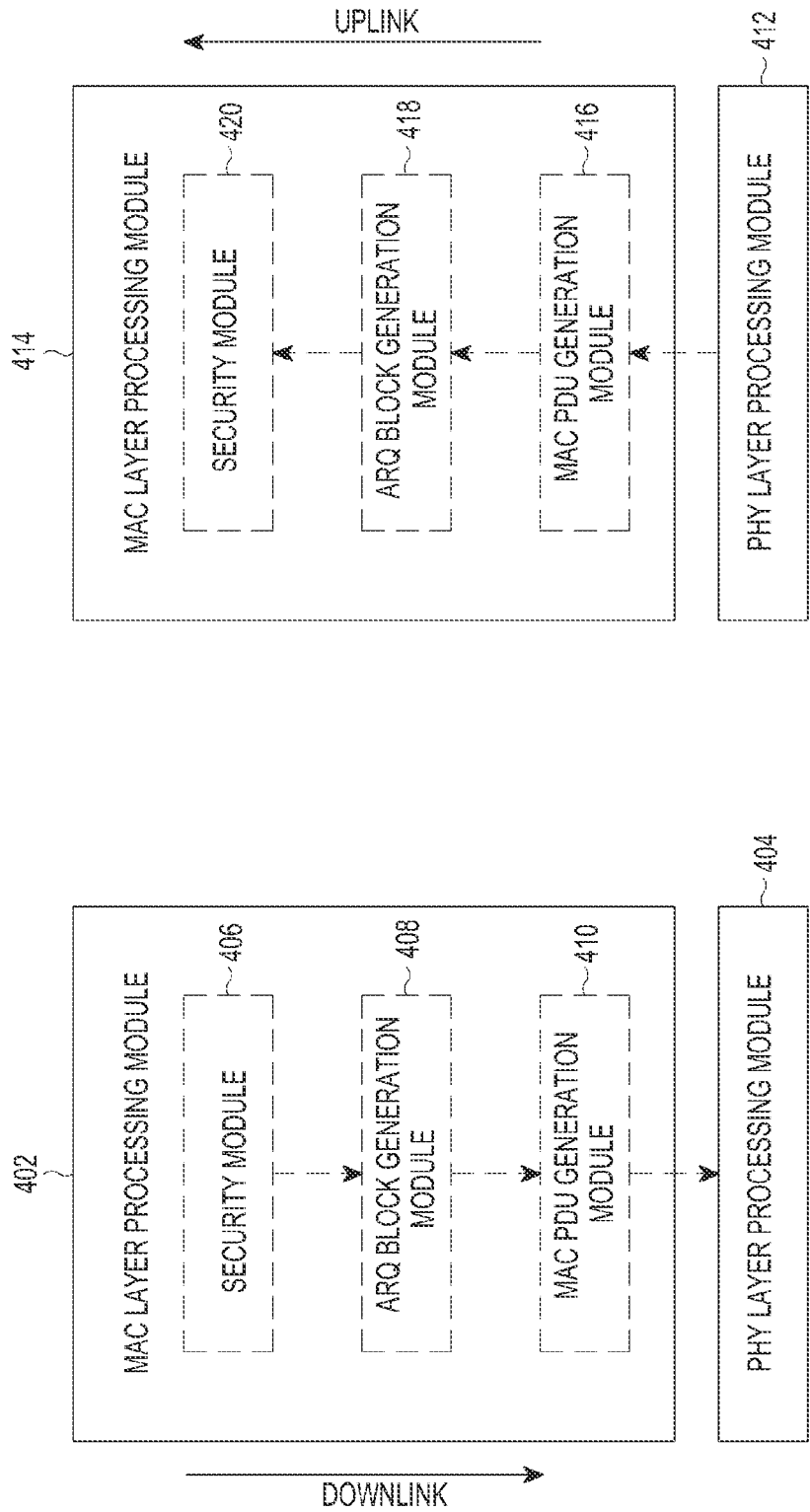
FIGS. 4A and 4B are schematic representations illustrating Medium Access Control (MAC) layer and Physical (PHY) layer processing performed by a base station in uplink and downlink, in the context of the present disclosure.

FIG. 3 is a process flowchart 300 illustrating an exemplary method of uplink communication of data packets in the cloud cell environment 100 by a BS, according to one embodiment of the present disclosure. Consider that, at step 302, data packets are received from a network node by the BS 106C. At step 304, the network node from which the data packets are received is identified by the BS 106C. For example, the BS 106C can receive the data packets directly from the MS 108A or MS 108B. Alternatively, the BS 106C can receive the data packets from another BS (e.g., the BS 106A) which is a slave BS in the CC 110A.

If the data packets are received from the MS 108A or 108B, at step 306, a network node to which the data packets to be sent is identified. The BS 106C sends the data packets directly to the data gateway 104 if the BS 106C has received data packets from the MS 108A in the CC 110A for which BS 106C is the master BS. However, the BS 106C sends the data packets to the BS 106E, which is master BS in the CC 110B, if the BS 106C has received the data packets from the MS 108B in the CC 110B for which the BS 106C is acting as a slave base station.

If the data packets are to be sent to the BS 106E, at step 308, partial processing of the data packets is performed by the BS 106C. In one embodiment, in partially processing the data packets, the slave BS 106C generates PHY PDUs by applying PHY layer processing functions such as demodulation, deinterleaving, decoding and the like on the data packets and generates MAC PDUs from the PHY PDUs. In another embodiment, in partially processing the data packets, the slave BS 106C generates PHY PDUs by applying PHY layer processing functions such as demodulation, deinterleaving, decoding and the like on the data packets and generates MAC PDUs from the PHY PDUs. In case of non-ARQ enabled connection, the slave BS 106C generates MAC SDUs (fragmented or unfragmented) by applying the unpacking function on the MAC PDU. In case of an ARQ enabled connection, the slave BS 106C generates ARQ blocks (fragmented or unfragmented) by applying the unpacking function on the MAC PDU.

At step 310, the partially processed data packets are transmitted to the BS 106E so that the master BS 106E performs complete processing of the partially processed data packets and transmits the completely processed data packets to the data gateway 104. If the data packets are to be sent to the data gateway 104, at step 314, complete processing of the data packets is performed by the BS 106C. At step 316, the completely processed data packets are transmitted to the data gateway 104. In completely processing the data packets, the BS 106C performs the complete MAC layer and PHY layer processing of the data packets. Then, the BS 106C generates the PHY PDUs by applying PHY layer processing functions such as demodulation, deinterleaving, decoding and the like on the data packets. The BS 106C generates MAC PDUs from the PHY PDUs using the de-concatenation function. In case of a non-ARQ enabled connection, the BS 106C generates MAC SDUs (fragmented or unfragmented) by applying the unpacking function on the MAC PDU.

In case of an ARQ enabled connection, the BS 106C generates ARQ blocks (fragmented or unfragmented) by applying the unpacking function on the MAC PDU. The BS 106C then generates unfragmented ARQ blocks or MAC SDUs by applying the reassembly function to the fragmented ARQ blocks or MAC SDUs respectively. In case of the ARQ enabled connection, the BS 106C generates MAC SDUs from the ARQ blocks. It can be noted that the BS 106C can optionally apply the security function to the MAC SDUs and generate data packets from the MAC SDUs.

If at step 304, the network node, from which the data packets are received, is identified as the BS 106A, then it implies that the BS 106C is the master BS in the CC 110A and the data packets are partially processed by the BS 106A. Hence, at step 312, complete processing of the partially processed data packets is performed by the BS 106C. At step 316, the completely processed data packets are transmitted to the data gateway 104.

In one embodiment, in completely processing the data packets, the BS 106C performs the complete MAC layer processing on the partially processed data packets (i.e., MAC PDUs) received from the slave BS 106A. In case of a non-ARQ enabled connection, the BS 106C generates MAC SDUs (fragmented or unfragmented) by applying the unpacking function on the MAC PDU. In case of an ARQ enabled connection, the BS 106C generates ARQ blocks (fragmented or unfragmented) by applying the unpacking function on the MAC PDU. The BS 106C then generates unfragmented ARQ blocks or MAC SDUs by applying the reassembly function to the fragmented ARQ blocks or MAC SDUs respectively. In case of an ARQ enabled connection, the BS 106C generates MAC SDUs from the ARQ blocks. It can be noted that, the BS 106C optionally applies security function to the MAC SDUs and generates data packets from the MAC SDUs.

In another embodiment, in completely processing the data packets, the BS 106C performs the partial MAC layer processing on the partially processed data packets (i.e. MAC SDUs or ARQ blocks) received from the slave BS 106 A. The BS 106C then generates unfragmented ARQ blocks or MAC SDUs by applying the reassembly function to the fragmented ARQ blocks or MAC SDUs respectively. In case of an ARQ enabled connection, the BS 106C generates MAC SDUs from the ARQ blocks. Then, the BS 106 can optionally apply security function to the MAC SDUs and generates the data packets from the MAC SDUs.

FIGS. 4A and 4B are schematic representations illustrating Medium Access Control (MAC) layer and Physical (PHY) layer processing performed by a BS in uplink and downlink, in the context of the present disclosure. Typically, when a data packet is received, a BS (e.g., the BSs 106A-F) performs MAC layer and PHY layer processing on the data packet prior to transmitting the data packet to the network node (e.g., data gateway, another base station or a mobile station). These functions are performed in a downlink direction by a MAC layer processing module 402 and a PHY layer processing module 404 residing in BSs as illustrated in FIG. 4A, and in uplink direction by a PHY layer processing module 412 and a MAC layer processing module 414 residing in BSs as illustrated in FIG. 4B. The MAC layer processing module 402 can include a security module 406, an Automatic Repeat Request (ARQ) block generation module 408, and a MAC Protocol Data Unit (PDU) generation module 410. The MAC layer processing module 414 can include an MAC PDU generation module 416, an ARQ block generation module 418, and a security module 420. The security modules 406 and 420, and the ARQ block generation modules 408 and 418 are optional and are implemented when the security and ARQ functions are enabled in the BS.

Referring to FIG. 4A, in downlink if the security function is enabled, the security module 406 generates encrypted MAC Service Data Units (SDUs) from the data packet received from the data gateway 104. The ARQ block generation module 408 generates ARQ blocks from either from the encrypted MAC SDUs if the security function is enabled or unencrypted MAC SDUs if the security function is disabled. It can be noted that the ARQ function is optional and is not required to be applied on all the MAC SDUs. In other words, the ARQ function is applied only for the MAC SDUs of an ARQ enabled connection. Then, the MAC PDU generation module 410 generates MAC PDUs by applying fragmentation and packing function on the ARQ blocks or MAC SDUs. The MAC PDU generation module 410 can also multiplex ARQ blocks or MAC SDUs from multiple connections in a single MAC PDU. Alternatively, for an ARQ enabled connection, fragmentation and packing function can be applied on the MAC SDUs to generate the ARQ block. In this case, fragmentation and packing function is not applied by the MAC PDU generation module 410. Accordingly, the PHY layer processing module 404 generates one or more PHY PDUs by applying concatenation function on the MAC PDUs received from the MAC layer processing module 402 and processes the one or more PHY PDUs using PHY processing functions (e.g., coding, modulation, interleaving and the like).

In some implementation, the MAC layer processing module 402 is implemented through various sub layers including but not limited to a packet data convergence protocol (PDCP) sub layer, a radio link control sub layer, and a MAC sub layer. For example, the PDCP sub layer applies security functions on data packets received from the data gateway 104 and generates PDCP PDUs. The RLC sub layer applies ARQ function on the PDCP PDUs and generates RLC PDUs. The RLC sub layer also applies fragmentation and packing function on the PDCP PDUs to generate the RLC PDUs. The MAC sub layer performs multiplexing of the RLC PDUs and generates the MAC PDU. Accordingly, the PHY layer processing module 404 generates one or more PHY PDUs by applying concatenation function on the MAC PDUs received from the MAC sub layer and processes the one or more PHY PDUs using PHY processing functions (e.g., coding, modulation, interleaving and the like).

Referring to FIG. 4B, in uplink, the PHY layer processing module 412 performs PHY layer processing functions such as demodulation, deinterleaving, decoding and the like on the data packets, and generates the PHY PDUs from the data packets. The PHY layer processing module 412 then applies de-concatenation function on the PHY PDUs to generate the MAC PDUs from the PHY PDUs. In case the MAC PDU generation module 416 supports multiplexing of MAC PDUs, the MAC PDU generation module 416 applies demultiplexing function on the MAC PDUs to obtain ARQ blocks or MAC SDUs for various connections.

In case of a non-ARQ enabled connection, the MAC PDU generation module 416 generates the MAC SDUs (fragmented or unfragmented) by applying the unpacking function on the MAC PDUs. In case of an ARQ enabled connection, the MAC PDU generation module 416 generates ARQ blocks (fragmented or unfragmented) by applying the unpacking function on the MAC PDU. If the fragmented ARQ blocks or MAC SDUs are generated, then the MAC PDU generation module 416 generates unfragmented ARQ blocks or MAC SDUs by applying the reassembly function to the fragmented ARQ blocks or MAC SDUs respectively. In case of an ARQ enabled connection, the ARQ block generation module 408 generates MAC SDUs from the ARQ blocks. The security module 406 optionally applies security to MAC SDUs and generates data packets from the MAC SDUs.

In some implementations, the MAC layer processing module 414 is implemented through various sub layers including but not limited to a MAC sub layer, a RLC sub layer, and a PDCP sub layer. For example, the MAC sub layer demultiplexes the RLC PDUs received from the PHY layer processing module 412 and provides the demultiplexed RLC PDUs to the RLC sub layer. The RLC sub layer performs unpacking or reassembly and ARQ functions (if ARQ connection is enabled) to generate PDCP PDUs. The PDCP sub layer applies security function to the PDCP PDUs to generate data packets.

According to the one or more embodiments described above, MAC layer and/or PHY layer processing of data packets is performed either completely or in part by a master BS and a slave BS of a cloud cell although the BSs 106A-F are capable of performing MAC layer processing and PHY layer processing on data packets in entirety. For example, the BS 106C is a master BS in the cloud cell 110A, whereas in the cloud cell 110B, the BS 106C acts as a slave BS while the BS 106E acts as a master BS. In such scenario, the BS 106C can perform partial or complete MAC layer processing and/or complete PHY layer processing of the data packet based on a network node from which the data packet is received and a network node to which the data packet is to be forwarded in the cloud cell. It can be noted that, in some exemplary implementations, the entire/partial MAC layer processing of the data packets is implemented through various sub layers such as PDCP sub layer, RLC sub layer and MAC sub layer.

Figure 5:
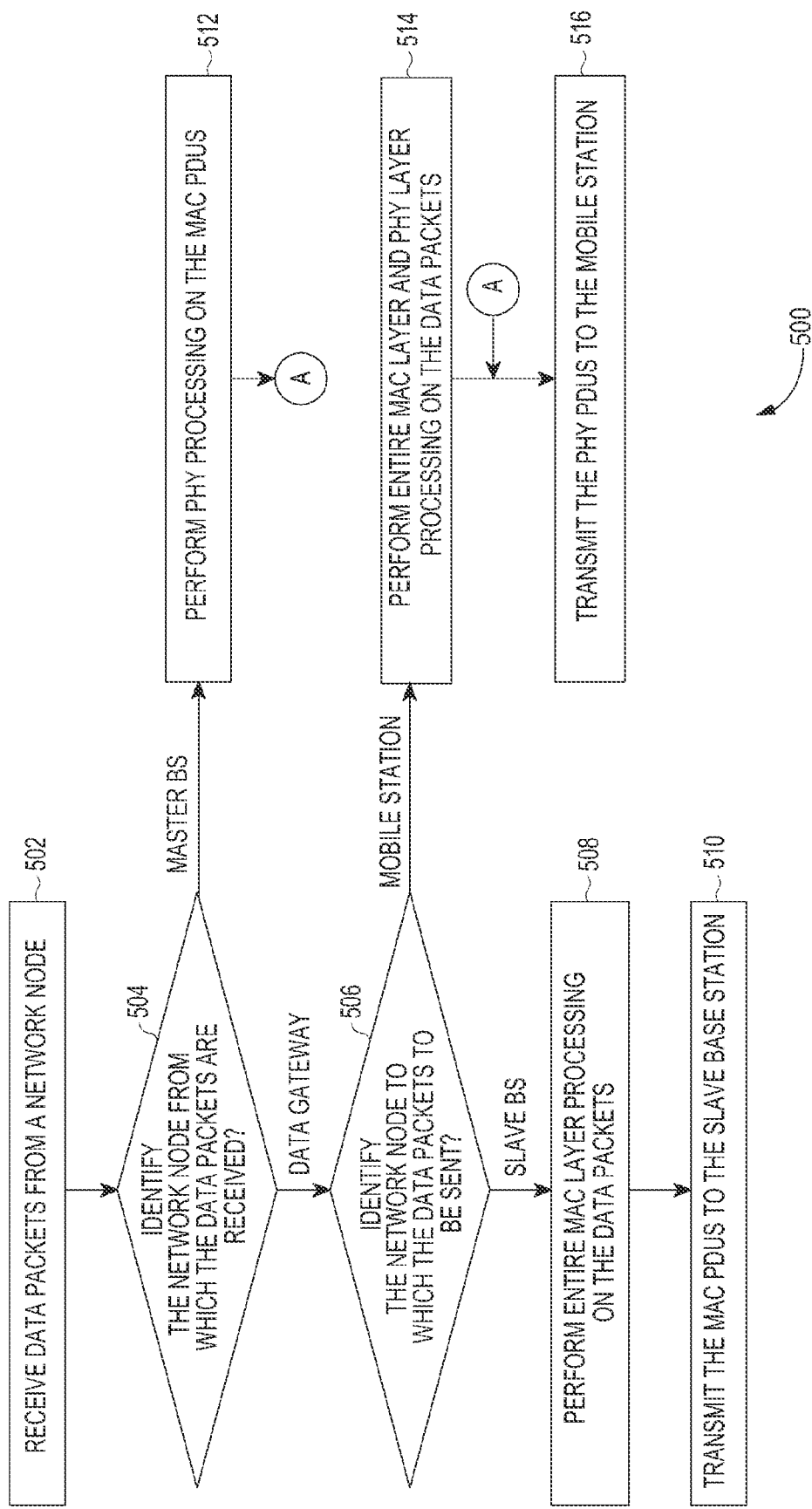
FIG. 5 is a process flowchart illustrating a detailed method of downlink communication of data packets in the cloud cell environment by a base station, according to one embodiment of the present disclosure.

FIG. 5 is a process flowchart 500 illustrating a detailed method of downlink communication of data packets in the cloud cell environment 100 by a BS, according to one embodiment of the present disclosure. Consider that, at step 502, data packets are received from a network node by the BS 106C. At step 504, the network node from which the data packets are received is identified by the BS 106C. If the data packets are received from the data gateway 104, at step 506, a network node to which the data packets to be sent is identified.

Figure 6A:
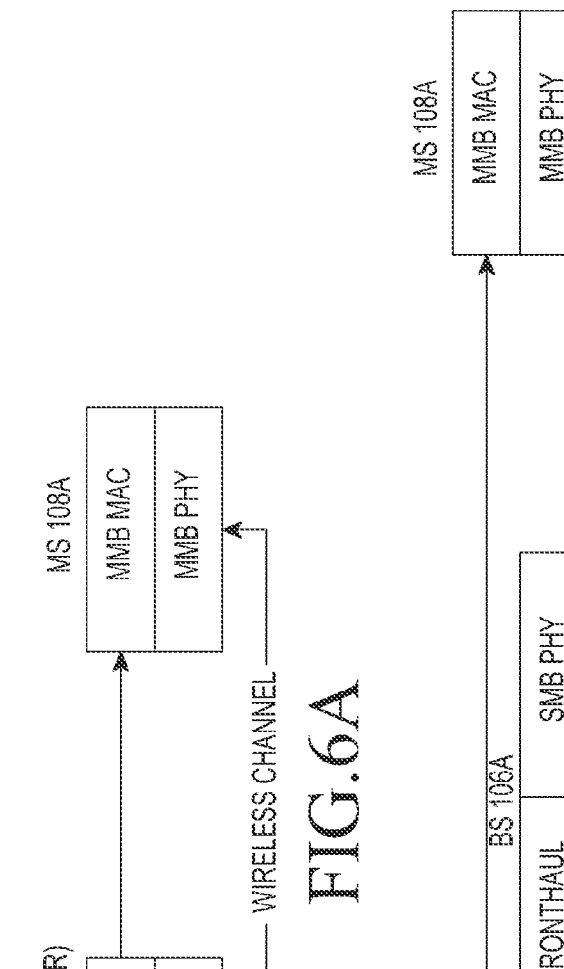
Figure 6B:
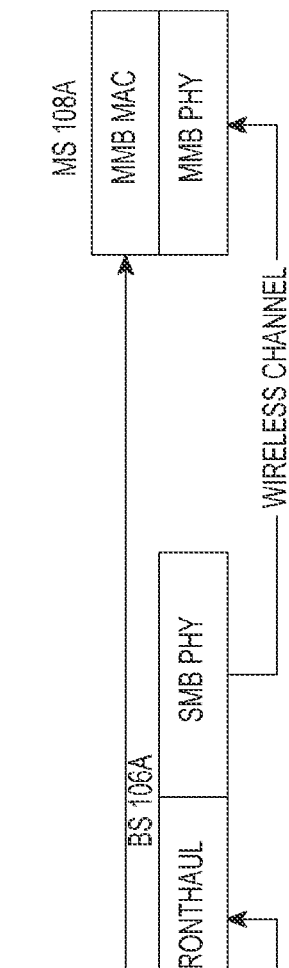

If the data packets are to be sent to the BS 106A, then at step 508, complete MAC layer processing is performed on the data packets by the BS 106C. In one exemplary implementation, complete MAC layer processing is performed on the data packets by the BS 106C using a PDCP layer, a RLC sub layer, and a MAC sub layer. At step 510, the MAC PDUs and a logical identifier assigned to the MS 108A are transmitted to the slave BS 106A so that the slave BS 106A performs PHY layer processing on the MAC PDUs and transmits the PHY PDUs to the MS 108A based on the logical identifier (as shown in FIGS. 6B and 6E). If the data packets are to be sent to the MS 108A, then at step 514, complete MAC layer processing and PHY layer processing of the data packets is performed by the BS 106C. At step 516, the PHY PDUs are transmitted to the MS 108A (as shown in FIGS. 6A and 6D).

Figure 6C:
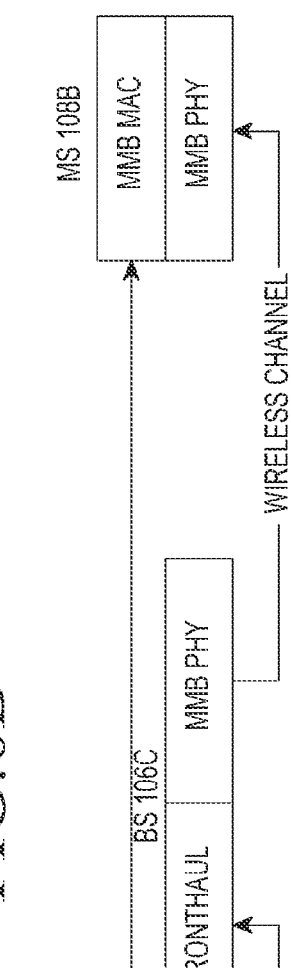

If at step 504, the network node, from which the MAC PDUs are received, is identified as the master BS 106E, then at step 512, PHY layer processing is performed on the MAC PDUs by the BS 106C. At step 516, the PHY PDUs are transmitted to the MS 108B by the BS 106C (as shown in FIGS. 6C and 6F).

Figure 7:
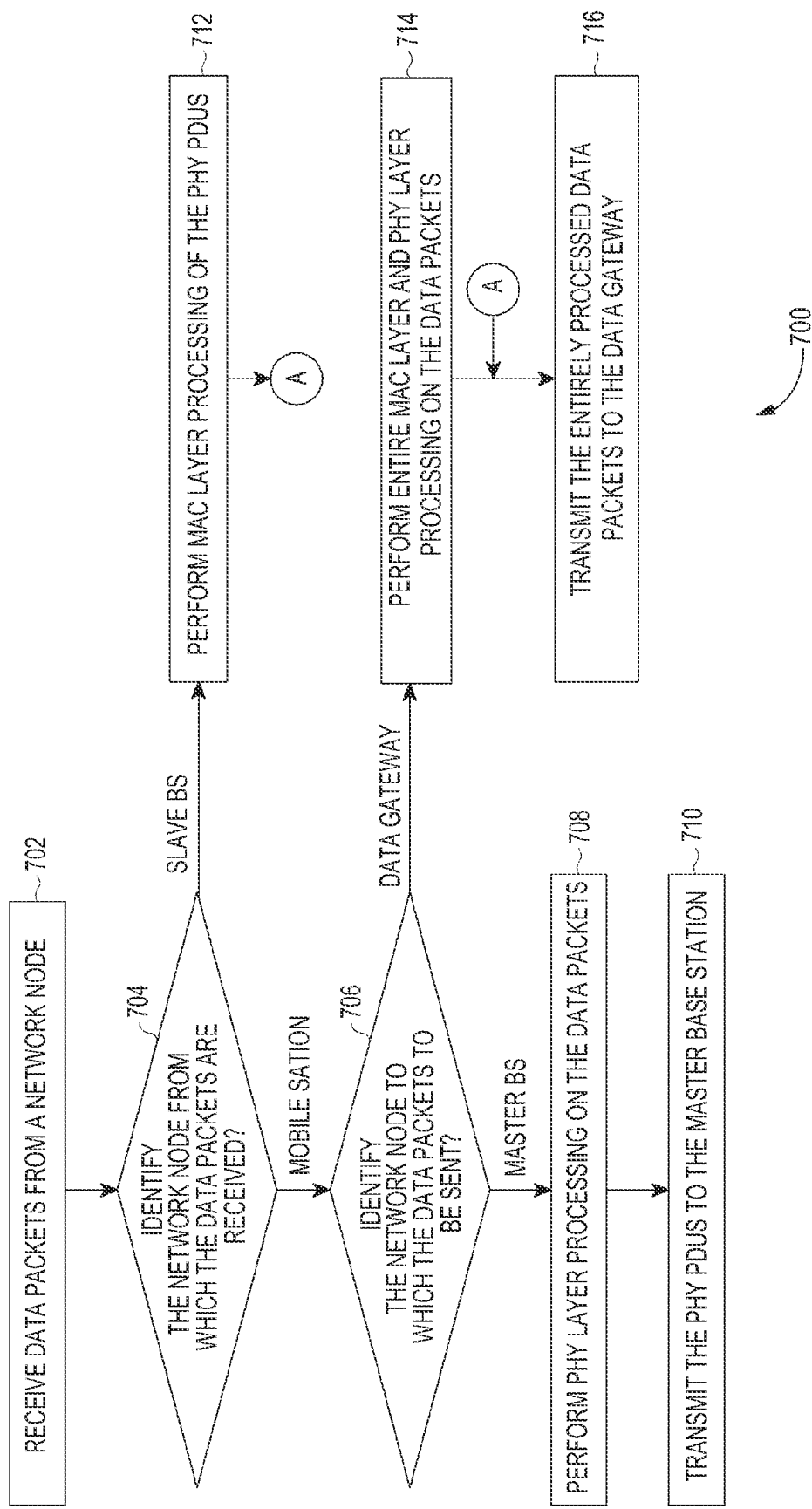
FIG. 7 is a process flowchart illustrating a detailed method of uplink communication of data packets in the cloud cell environment by a base station, according to one embodiment of the present disclosure.

FIG. 7 is a process flowchart 700 illustrating a detailed method of uplink communication of data packets in the cloud cell environment 100 by a BS, according to one embodiment of the present disclosure. Consider that, at step 702, data packets are received from a network node by the BS 106C. At step 704, the network node from which the data packets are received is identified by the BS 106C. If the data packets are received from the MS 108A or 108B, at step 706, a network node to which the data packets to be sent is identified.

Figures 8D, 8E, 8F:
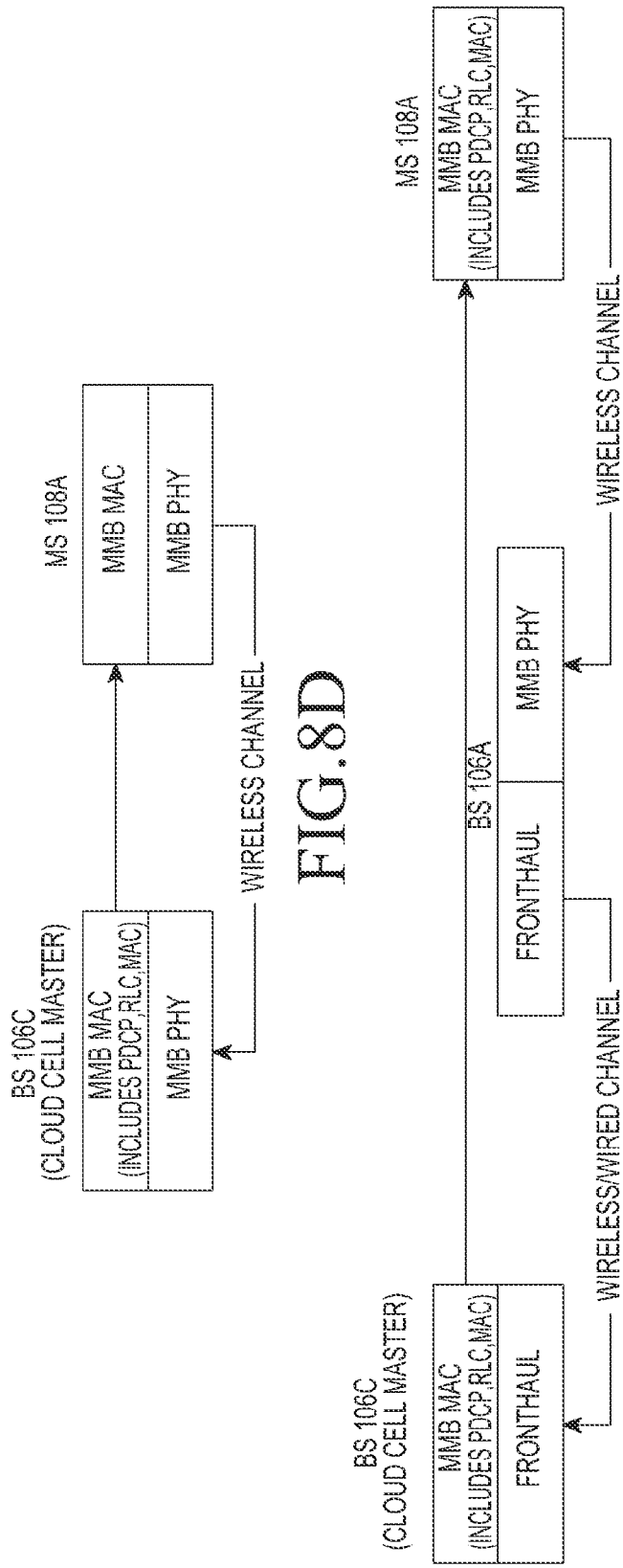

If the data packets are to be sent to the BS 106E, at step 708, PHY layer processing is performed on the data packets by the BS 106C. At step 710, the MAC PDUs are transmitted to the BS 106E so that the master BS 106E performs complete MAC layer processing on the MAC PDUs and transmits the completely processed data packets to the data gateway 104 (as shown in FIG. 8B). In an exemplary implementation, the master BS 106E performs complete MAC layer processing, which includes PDCP, RLC and MAC sub layer processing, on the data packets and transmits the completely processed data packets to the data gateway 104 (as shown in FIG. 8E). If the data packets are to be directly sent to the data gateway 104, at step 714, complete MAC layer and PHY layer processing is performed on the data packets by the BS 106C. At step 716, the completely processed data packets are transmitted to the data gateway 104 (as shown in FIG. 8A). In an exemplary implementation, the BS 106C performs complete MAC layer processing, which includes PDCP, RLC and MAC sub layer processing, and complete PHY layer processing on the data packets and transmits the completely processed data packets to the data gateway 104 (as shown in FIG. 8D).

If at step 704, the network node, from which the MAC PDUs are received, is identified as the BS 106A, then at step 712, complete MAC layer processing is performed on the MAC PDUs by the BS 106C. At step 716, the completely processed data packets are transmitted to the data gateway 104 (as shown in FIG. 8C). In an exemplary implementation, the BS 106C performs complete MAC layer processing, which includes PDCP, RLC and MAC sub layer processing, on the data packets and transmits the completely processed data packets to the data gateway 104 (as shown in FIG. 8F).

Figure 9:
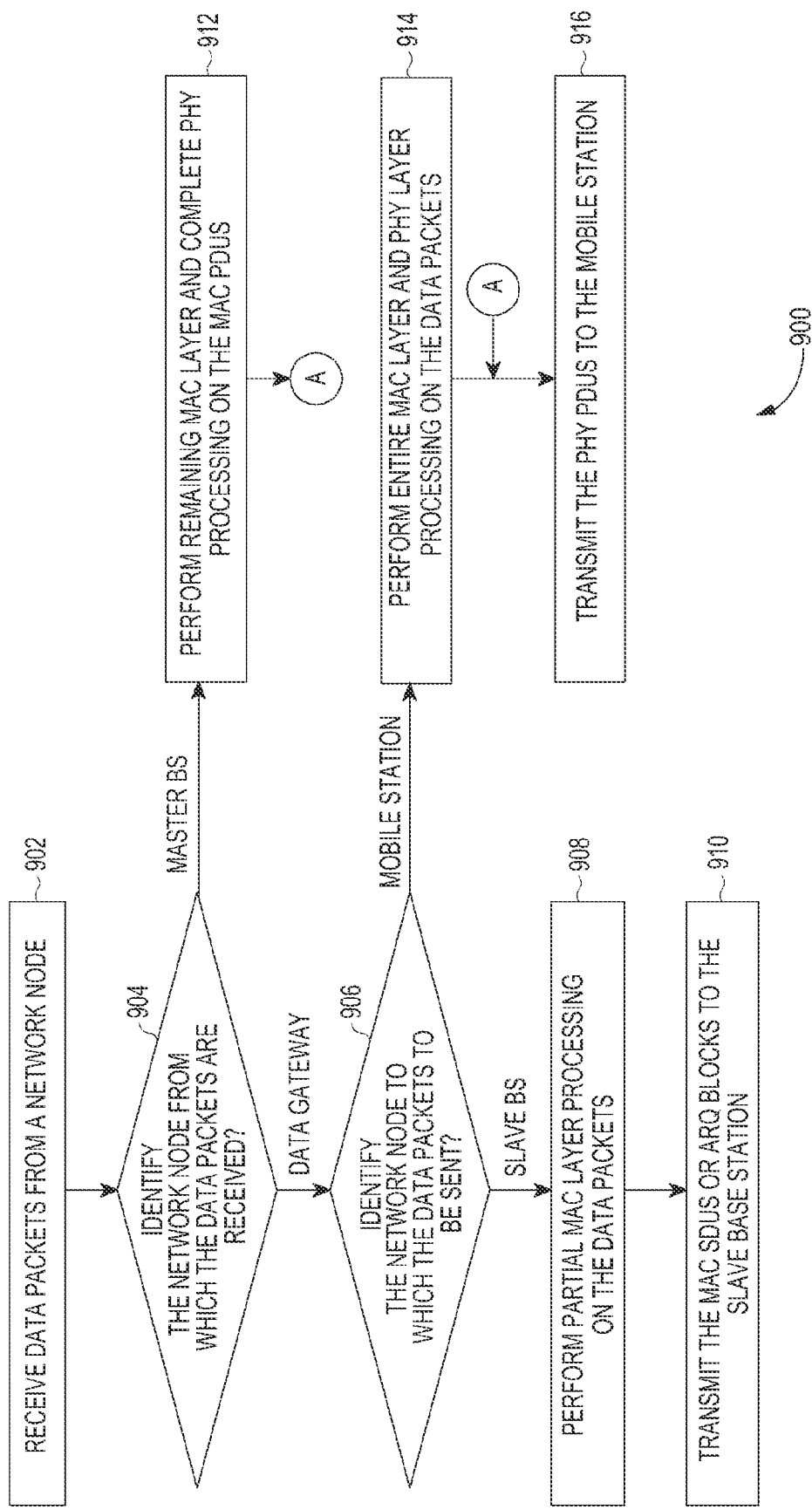
FIG. 9 is a process flowchart illustrating a detailed method of downlink communication of data packets in the cloud cell environment by a base station, according to another embodiment of the present disclosure.

FIG. 9 is a process flowchart 900 illustrating a detailed method of downlink communication of data packets in the cloud cell environment 100 by a BS, according to another embodiment of the present disclosure. Consider that, at step 902, data packets are received from a network node by the BS 106C. At step 904, the network node from which the data packets are received is identified by the BS 106C. If the data packets are received from the data gateway 104, at step 906, a network node to which the data packets to be sent is identified.

If the data packets are to be sent to the BS 106A, then at step 908, partial MAC layer processing is performed on the data packets by the BS 106C. In one exemplary implementation, the MAC layer processing involves generating MAC SDUs, generating ARQ blocks (if ARQ connection is enabled) and/or sequence numbering. At step 910, the MAC SDUs/ARQ blocks and/or a logical identifier assigned to the MS 108A are transmitted to the slave BS 106A so that the slave BS 106A performs remaining MAC layer processing on the MAC SDUs or ARQ blocks and then PHY layer processing on the MAC PDUs, and transmits the PHY PDUs to the MS 108A based on the logical identifier (as shown in FIG. 10B). Additionally, static and dynamic parameters corresponding to the logical connection of MAC SDUs/ ARQ blocks can be transmitted by the BS 106C to the slave BS 106A along with the MAC SDUs/ARQ blocks and/or the logical identifier. The static and dynamic parameters can include at least one of connection identifier, MAC SDU/ ARQ block sequence number and Quality of Service parameters.

Figure 10J:
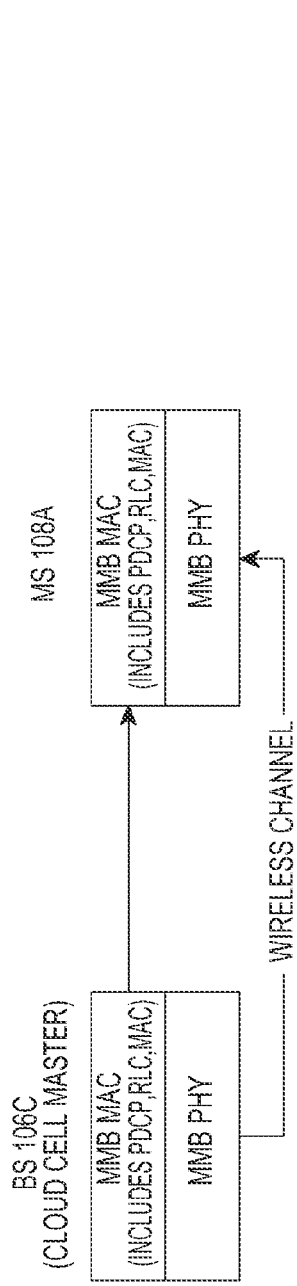
FIGS. 10A-10O are schematic representations illustrating downlink communication of data packets in the cloud cell environment by a base station, according to another embodiment of the present disclosure.
Figure 10K:
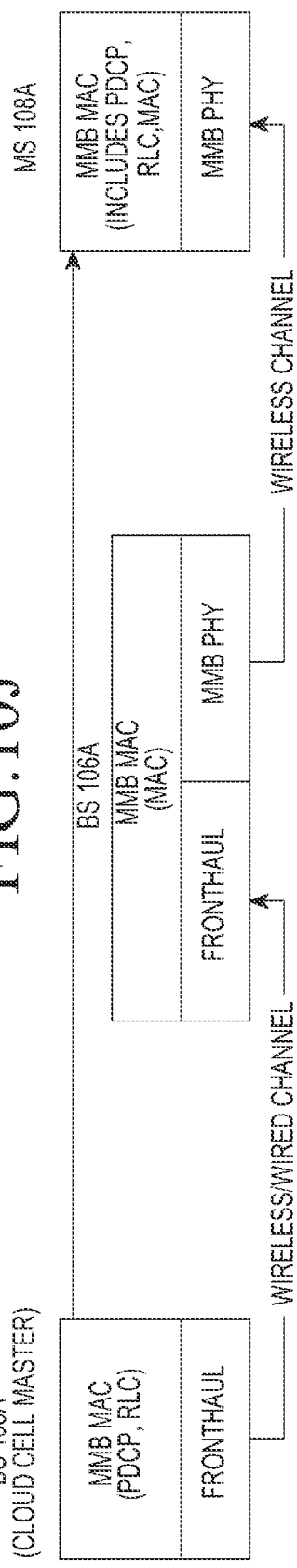
Figure 10L:
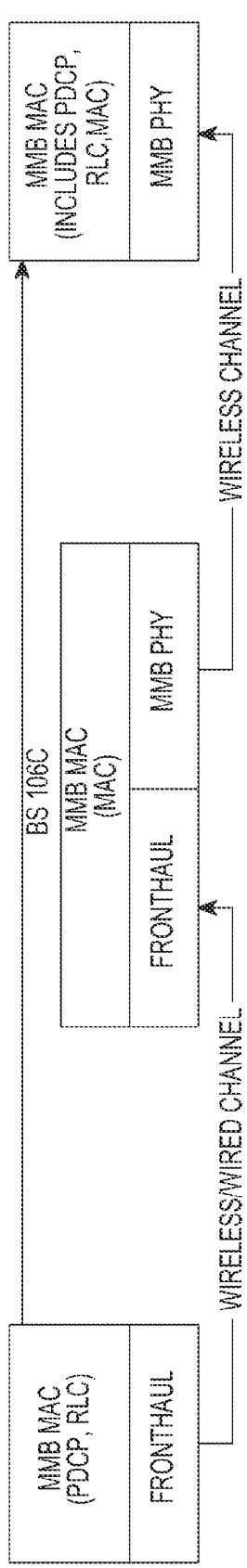
Figure 10M:
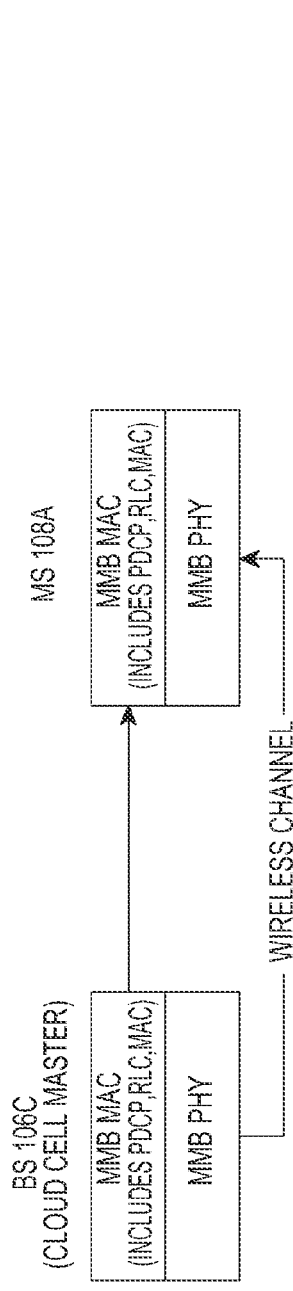

When the MAC layer processing of data packets includes PDCP, RLC and MAC sub layer processing, in one embodiment, the partial MAC layer processing performed by the BS 106C includes PDCP and RLC sub layer processing on the data packets. In this embodiment, at step 910, RLC PDUs and/or a logical identifier assigned to the MS 108A are transmitted to the slave BS 106A so that the slave BS 106A performs remaining MAC layer processing including MAC sub layer processing on the RLC PDUs to generate MAC PDUs followed by complete PHY layer processing on the MAC PDUs, and transmits the PHY PDUs to the MS 108A based on the logical identifier (as shown in FIG. 10K).

In another embodiment, the partial MAC layer processing performed on the data packets by the BS 106C includes generation of MAC SDUs from the data packets (e.g., IP packets). The MAC SDU generation can include at least one of header compression, security, and sequence numbering. It can be noted that, the security function can not be applied if the security function is applied at the data gateway 104 or if the security function is not enabled. If the security function is enabled and if the security function is not applied at the data gateway 104, security function is applied on the data packets by the master BS 106C. In this embodiment, at step 910, the MAC SDUs and/or a logical identifier assigned to the MS 108A are transmitted to the slave BS 106A so that the slave BS 106A performs remaining MAC layer processing on the MAC SDUs followed by PHY layer processing on the MAC PDUs, and transmits the PHY PDUs to the MS 108A based on the logical identifier (as shown in FIG. 10D). In case of encrypted MAC SDUs, the security parameters like security key identifier, parameters for replay attack like roll over counter, packet number, etc. are included in the MAC SDUs. Further, static and dynamic parameters corresponding to the logical connection of MAC SDUs can also be transmitted by the BS 106C to the slave BS 106A together with the MAC SDUs. The static and dynamic parameters can include at least one of connection identifier, MAC SDU sequence number, quality of service parameters, ARQ state machine parameters for ARQ enabled connection, and connection type (e.g., ARQ enabled connection or non-ARQ enabled connection).

Figure 10N:
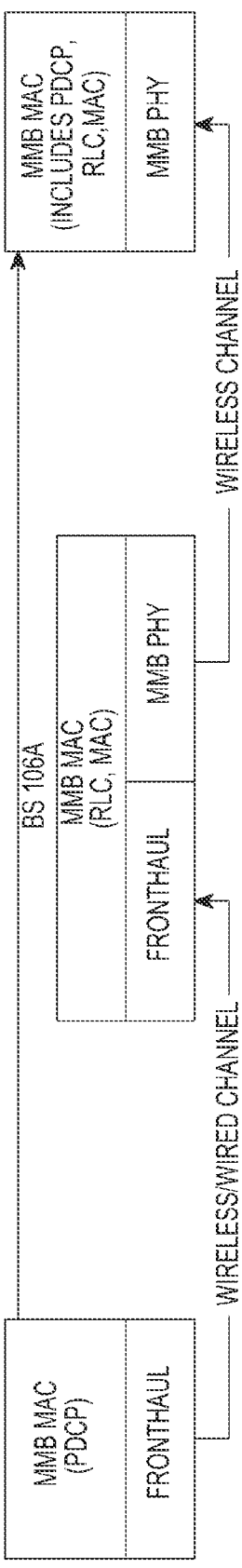

In yet another embodiment, when the MAC layer processing on the data packets includes PDCP, RLC and MAC sub layer processing, the partial MAC processing performed by the BS 106C includes PDCP sub layer processing on the data packets. In this embodiment, at step 910, the PDCP PDUs and/or a logical identifier assigned to the MS 108A are transmitted to the slave BS 106A so that the slave BS 106A performs remaining MAC layer processing which includes RLC sub layer and MAC sub layer processing on the PDCP PDUs to generate MAC PDUs followed by PHY layer processing on the MAC PDUs, and transmits the PHY PDUs to the MS 108A based on the logical identifier (as shown in FIG. 10N).

In further another embodiment, the partial MAC layer processing performed on the data packets by the BS 106C includes generating MAC SDUs from the data packets (e.g., IP packets). The MAC SDU generation includes sequence numbering. In this embodiment, at step 910, the MAC SDUs and a logical identifier assigned to the MS 108A are transmitted to the slave BS 106A so that the slave BS 106A performs remaining MAC layer processing on the MAC SDUs followed by PHY layer processing on the MAC PDUs, and transmits the PHY PDUs to the MS 108A based on the logical identifier (as shown in FIG. 10H). Additionally, static and dynamic parameters corresponding to the logical connection of MAC SDUs can also be transmitted by the BS 106C to the slave BS 106A together with the MAC SDUs, at step 910. The static and dynamic parameters can include at least one of connection identifier, MAC SDU sequence number, quality of service parameters, ARQ state machine parameters for an ARQ enabled connection, connection type (ARQ or non ARQ), and security context parameters.

In case, at step 910, the BS 106C transmits the ARQ blocks to the BS 106A, the BS 106A can buffer the ARQ blocks received from the BS 106C for retransmitting the ARQ blocks to the MS 108A and clear the buffered ARQ blocks based on a predetermined trigger. In one exemplary implementation, the BS 106C can send a control message to the BS 106A indicating successful acknowledgement of ARQ blocks by the MS 108A. The BS 106A can clear the buffered ARQ blocks which are successfully acknowledged via the control message. In another exemplary implementation, the slave BS starts a timer upon receiving the ARQ blocks from the BS 106C and clears the buffered ARQ blocks upon expiry of the timer. The timer can be preconfigured based on time required to schedule, transmit and receive feedback from the MS 108A. In yet another exemplary implementation, the BS 106A can send a poll to the BS 106C to request the status of buffered ARQ blocks. In response, the BS 106C sends the status of buffered ARQ blocks. The BS 106A can clean the buffered ARQ blocks based on the status of the buffered ARQ blocks. In further another exemplary implementation, the BS 106A clears the buffered ARQ blocks when the BS 106A is deleted from the cloud cell 110A.

If the data packets are to be sent to the MS 108A, then at step 914, complete MAC layer processing and PHY layer processing is performed on the data packets by the BS 106C. At step 916, the PHY PDUs are transmitted to the MS 108A (as shown in FIGS. 10A, 10D, 10G, 10J, and 10M).

If at step 904, the network node, from which the data packets are received, is identified as the master BS 106E, then at step 912, remaining MAC layer processing is performed on the MAC SDUs or ARQ blocks followed by PHY layer processing on the MAC PDUs by the BS 106C. In some implementation, the remaining MAC layer processing involves generating MAC PDUs from the MAC SDUs (for non-ARQ connection) or ARQ blocks (for ARQ connection). At step 916, the PHY PDUs are transmitted to the MS 108B by the BS 106C (as shown in FIG. 10C). In one embodiment, when the MAC layer processing includes PDCP, RLC and MAC sub layer processing on the data packets, the remaining MAC processing performed by the BS 106E includes MAC sub layer processing of the data packets followed by PHY layer processing of the MAC PDUs to generate PHY PDUs. In this embodiment, at step 916, the PHY PDUs are transmitted to the MS 108B by the BS 106C (as shown in FIG. 10K).

In another embodiment, if at step 904, the network node, from which the data packets are received, is identified as the master BS 106E, then at step 912, remaining MAC layer processing is performed on the MAC SDUs followed by PHY layer processing on the MAC PDUs. In this embodiment, the remaining MAC layer processing involves generating ARQ blocks from the MAC SDUs received for an ARQ connection and then generating MAC PDUs from the generated ARQ blocks. For a non-ARQ connection, the remaining MAC layer processing involves generating MAC PDUs from the MAC SDUs received for the non ARQ connection. At step 916, the PHY PDUs are transmitted to the MS 108B by the BS 106C (as shown in FIG. 10F).

Figure 10O:
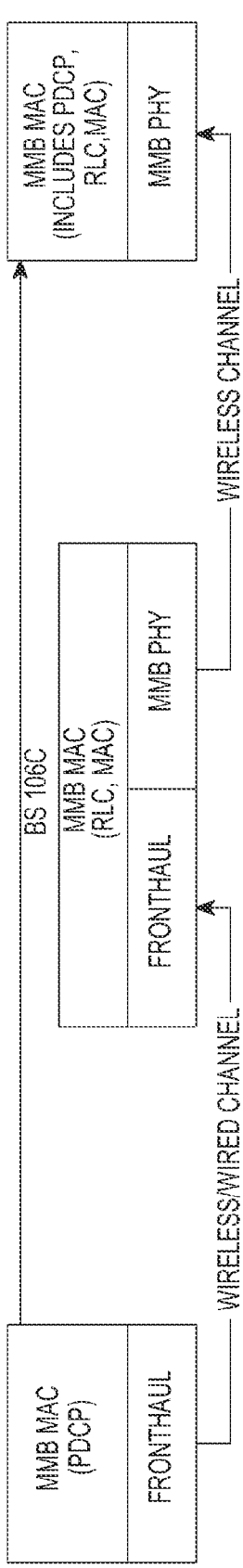

When the MAC layer processing includes PDCP, RLC and MAC sub layer processing of the data packets, the remaining MAC processing performed by the BS 106E includes RLC and MAC sub layer processing of data packets followed by PHY layer processing of the MAC PDUs to generate PHY PDUs. In this embodiment, at step 916, the PHY PDUs are transmitted to the MS 108B by the BS 106C (as shown in FIG. 10O).

In yet another embodiment, if at step 904, the network node, from which the data packets are received, is identified as the master BS 106E, then at step 912, remaining MAC layer processing is performed on the MAC SDUs followed by PHY layer processing on the MAC PDUs. In this embodiment, the remaining MAC layer processing involves applying security function to the MAC SDUs if security is enabled for the logical connection, generating ARQ blocks from the MAC SDUs received for an ARQ connection and then generating MAC PDUs from the generated ARQ blocks. For non-ARE connection, the remaining MAC layer processing involves applying security function to the MAC SDUs if security is enabled for the connection and then generating MAC PDUs from the MAC SDUs. At step 916, the PHY PDUs are transmitted to the MS 108B by the BS 106C (as shown in FIG. 10I).

Figure 11:
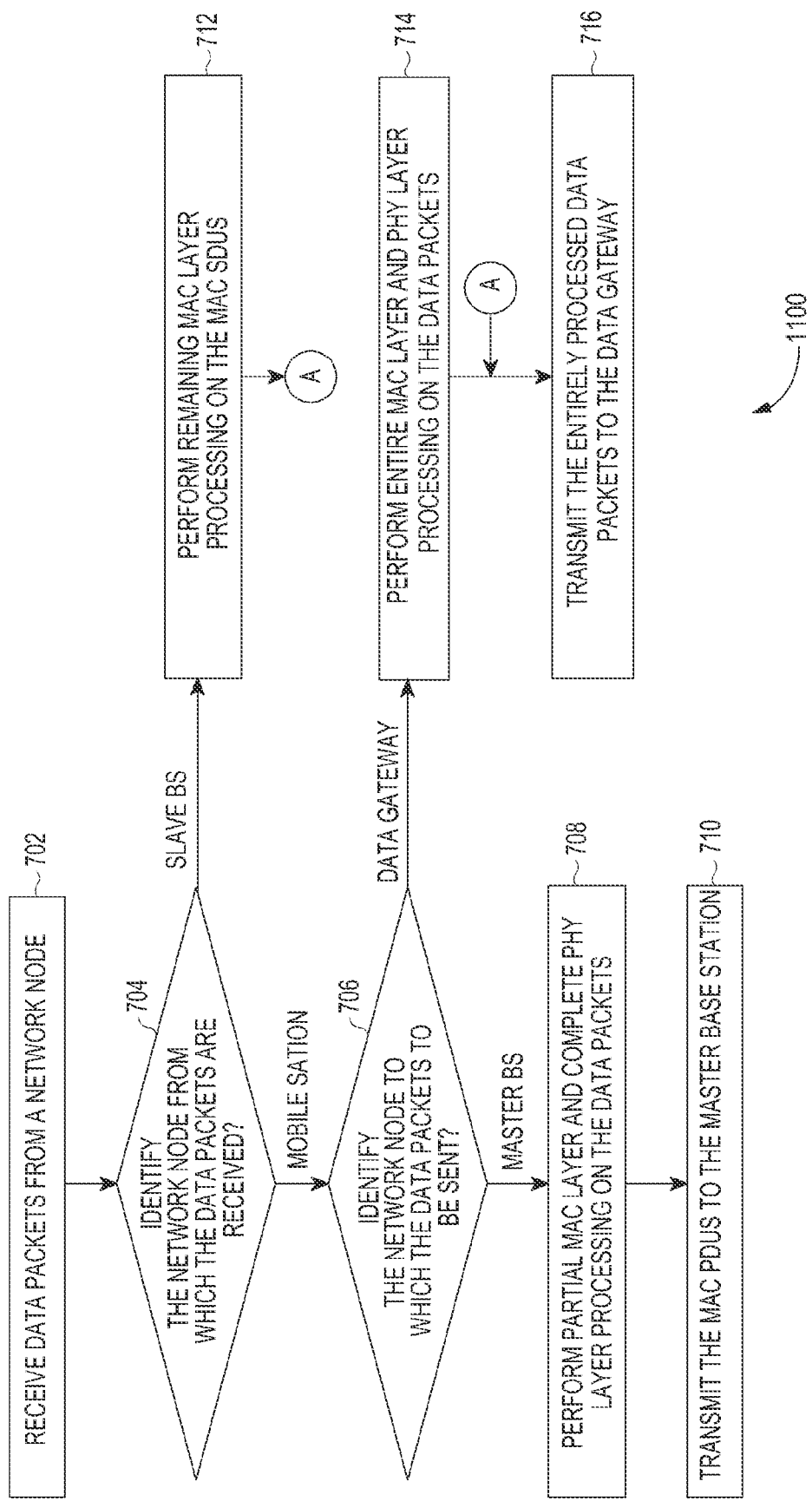
FIG. 11 is a process flowchart illustrating a detailed method of uplink communication of data packets in the cloud cell environment by a base station, according to another embodiment of the present disclosure.

FIG. 11 is a process flowchart 1100 illustrating a detailed method of uplink communication of data packets in the cloud cell environment 100 by a BS, according to one embodiment of the present disclosure. Consider that, at step 1102, data packets are received from a network node by the BS 106C. At step 1104, the network node from which the data packets are received is identified by the BS 106C. If the data packets are received from the MS 108A or 108B, at step 1106, a network node to which the data packets to be sent is identified.

Figure 12A:
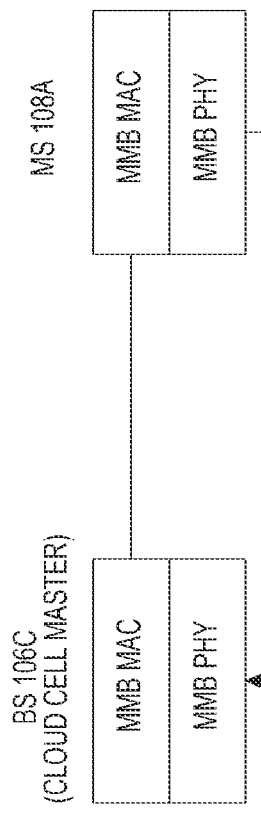
FIGS. 12A-12C are schematic representations illustrating uplink communication of data packets in the cloud cell environment by a base station, according to another embodiment of the present disclosure.
Figure 12B:
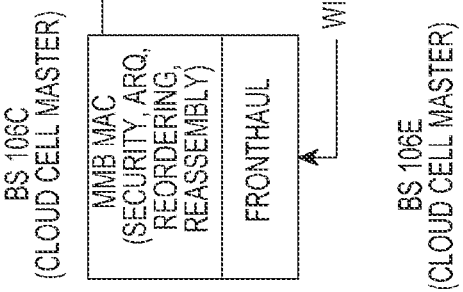

If the data packets are to be sent to the BS 106E, at step 1108, complete PHY layer processing is performed on the data packets followed by partial MAC layer processing on the MAC PDUs. For example, the partial MAC layer processing involves unpacking the MAC PDUs to generate MAC SDUs. At step 1110, the MAC SDUs are transmitted to the BS 106E so that the master BS 106E performs remaining MAC layer processing on the MAC SDUs and transmits the completely processed data packets to the data gateway 104 (as shown in FIG. 12B). If the data packets are to be directly sent to the data gateway 104, at step 1114, complete PHY layer and MAC layer processing is performed on the data packets by the BS 106C. At step 1116, the completely processed data packets are transmitted to the data gateway 104 (as shown in FIG. 12A).

Figure 12C:
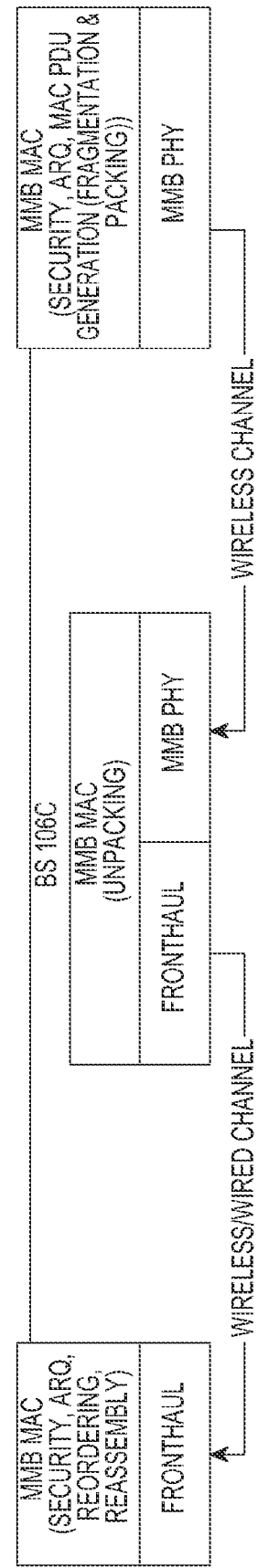

If at step 1104, the network node, from which the MAC SDUs are received, is identified as the BS 106A, then at step 1112, remaining MAC layer processing is performed on the MAC SDUs by the BS 106C. For example, said remaining MAC layer processing involves reassembly and reordering of MAC PDUs, generating ARQ blocks and/or generating MAC SDUs. At step 1116, the completely processed data packets are transmitted to the data gateway 104 by the BS 106C (as shown in FIG. 12C).

Figure 13:
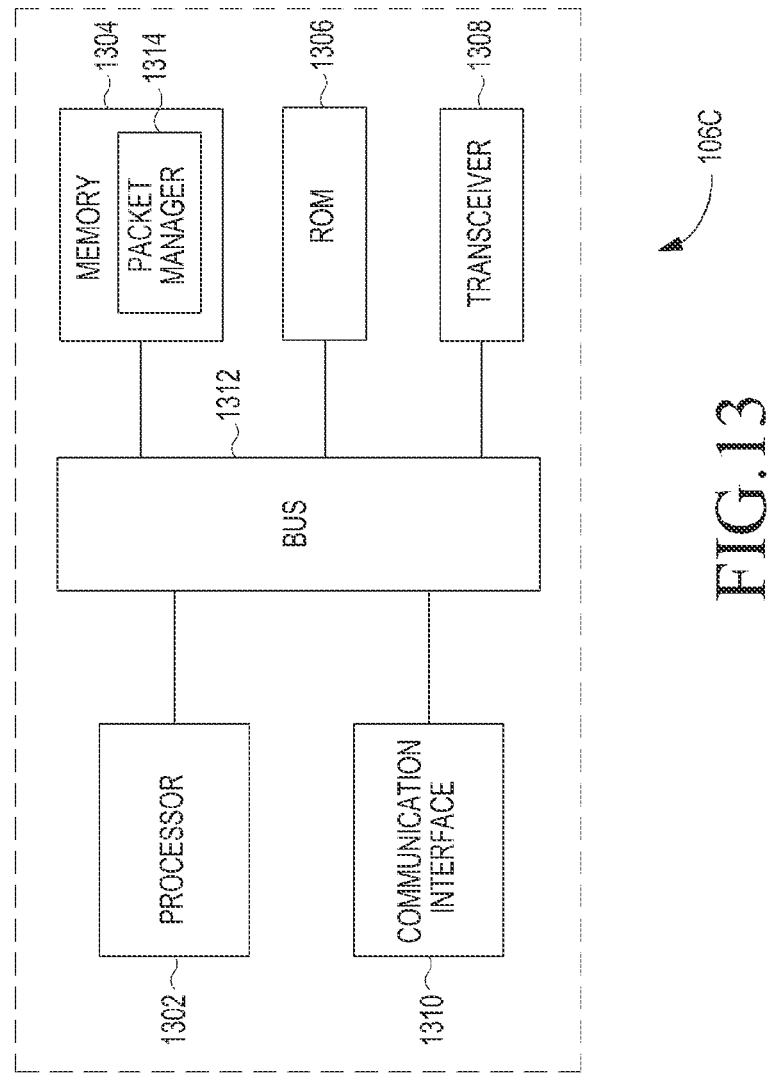
FIG. 13 illustrates a block diagram of a base station showing various components for implementing embodiments of the present disclosure.

FIG. 13 illustrates a block diagram of the BS 106C showing various components for implementing embodiments of the present disclosure. In FIG. 13, the BS 106C includes a processor 1302, memory 1304, a read only memory (ROM) 1306, a transceiver 1308, a communication interface 1310, and a bus 1312.

The processor 1302, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1302 can also include embedded controllers, such as generic or programmable logic devices or arrays, application specific integrated circuits, single-chip computers, smart cards, and the like.

The memory 1304 can be volatile memory and non-volatile memory. The memory 1304 includes a packet manager 1312 for processing and communicating data packets in uplink and downlink, according to the embodiments illustrated in FIGS. 1 and 12. A variety of computer-readable storage media can be stored in and accessed from the memory elements. Memory elements can include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Embodiments of the present disclosure can be implemented in conjunction with modules including functions, procedures, data structures, and application programs, for performing tasks, defining abstract data types, or low-level hardware contexts. The packet manager 1312 can be stored in the form of machine-readable instructions on any of the above-mentioned storage media which is then executed by the processor 1302. For example, a computer program can include machine-readable instructions capable of processing and communicating data packets to a network node (e.g., data gateway, BS, MS), according to the teachings and herein described embodiments of the present disclosure. The computer program can be included on a storage medium and loaded from the storage medium to a hard drive in the non-volatile memory. Moreover, the components such as the ROM 1306, the transceiver 1308, the communication interface 1310, and the bus 1312 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a first node in a wireless communication system, the method comprising:
   obtaining packets for a user equipment (UE), wherein the first node and a second node are involved in data transmission of the packets for the UE;
   generating packet data convergence protocol (PDCP) protocol data units (PDUs) by performing a PDCP layer processing to the packets; and
   transmitting, by a PDCP layer of the first node to a radio link control (RLC) layer of the second node, the PDCP PDUs via an interface between the first node and the second node,
   wherein the first node includes the PDCP layer for the PDCP layer processing, and
   wherein the second node includes the RLC layer and a medium access control (MAC) layer for processing the transmitted PDCP PDUs, and the second node does not include a PDCP layer.

2. The method of claim 1,
   wherein the first node comprises a master node for the data transmission and is connected to one or more slave nodes for the data transmission, and
   wherein the second node comprises one of the one or more slave nodes.

3. The method of claim 1,
   wherein a logical identifier of the UE associated with the first node or the second node is transmitted to the second node.

4. The method of claim 1, further comprising:
   transmitting, to the second node, a control message for indicating one or more buffered data blocks which are successfully transmitted to the UE,
   wherein the one or more buffered data blocks are cleared based on the control message.

5. A method performed by a second node in a wireless communication system, the method comprising:
   receiving, by a radio link control (RLC) layer of the second node from a packet data convergence protocol (PDCP) layer of a first node via an interface between the first node and the second node, PDCP protocol data units (PDUs) to which a PDCP layer processing is applied, wherein the first node and the second node are involved in data transmission of packets for a user equipment (UE);
   generating downlink data based on the PDCP PDUs, by performing a RLC layer processing and a medium access control (MAC) layer processing to the received PDCP PDUs; and
   transmitting, to the UE, the downlink data,
   wherein the first node includes the PDCP layer for the PDCP layer processing, and
   wherein the second node includes the RLC layer for the RLC layer processing to the received PDCP PDUs and a MAC layer for the MAC layer processing to the received PDCP PDUs, and the second node does not include a PDCP layer.

6. The method of claim 5,
   wherein the first node comprises a master node for the data transmission and is connected to one or more slave nodes for the data transmission, and
   wherein the second node comprises one of the one or more slave nodes.

7. The method of claim 5,
   wherein a logical identifier of the UE associated with the first node or the second node is received from the first node.

8. The method of claim 5, further comprising:
   receiving, from the first node, a control message for indicating one or more buffered data blocks which are successfully transmitted to the UE,
   wherein the one or more buffered data blocks are cleared based on the control message.

9. A first node in a wireless communication system, the first node comprising:
   a transceiver; and
   at least one processor coupled with the transceiver and configured to:
       obtain packets for a user equipment (UE), wherein the first node and a second node are involved in data transmission of the packets for the UE,
       generate packet data convergence protocol (PDCP) protocol data units (PDUs) by performing a PDCP layer processing to the packets, and
       transmit, by a PDCP layer of the first node to a radio link control (RLC) layer of the second node, the PDCP PDUs via an interface between the first node and the second node,
   wherein the first node includes the PDCP layer for the PDCP layer processing, and
   wherein the second node includes the RLC layer and a medium access control (MAC) layer for processing the transmitted PDCP PDUs, and the second node does not include a PDCP layer.

10. The first node of claim 9,
    wherein the first node comprises a master node for the data transmission and is connected to one or more slave nodes for the data transmission, and
    wherein the second node comprises one of the one or more slave nodes.

11. The first node of claim 9,
    wherein a logical identifier of the UE associated with the first node or the second node is transmitted to the second node.

12. The first node of claim 9, wherein the at least one processor is further configured to:
   transmit, to the second node, a control message for indicating one or more buffered data blocks which are successfully transmitted to the UE,
   wherein the one or more buffered data blocks are cleared based on the control message.

13. A second node in a wireless communication system, the second node comprising:
   a transceiver; and
   at least one processor coupled with the transceiver and configured to:
      receive, by a radio link control (RLC) layer of the second node from a packet data convergence protocol (PDCP) layer of a first node via an interface between the first node and the second node, PDCP protocol data units (PDUs) to which a PDCP layer processing is applied, wherein the first node and the second node are involved in data transmission of packets for a user equipment (UE),
      generate downlink data based on the PDCP PDUs, by performing a RLC layer processing and a medium access control (MAC) layer processing to the received PDCP PDUs, and
      transmit, to the UE, the downlink data,
   wherein the first node includes the PDCP layer for the PDCP layer processing, and
   wherein the second node includes the RLC layer for the RLC layer processing to the received PDCP PDUs and a MAC layer for the MAC layer processing to the received PDCP PDUs, and the second node does not include a PDCP layer.

14. The second node of claim 13,
   wherein the first node comprises a master node for the data transmission and is connected to one or more slave nodes for the data transmission, and
   wherein the second node comprises one of the one or more slave nodes.

15. The second node of claim 13,
   wherein a logical identifier of the UE associated with the first node or the second node is received from the first node.

16. The second node of claim 13, wherein the at least one processor is further configured to:
   receive, from the first node, a control message for indicating one or more buffered data blocks which are successfully transmitted to the UE,
   wherein the one or more buffered data blocks are cleared based on the control message.

\* \* \* \* \*